US012664751B2

(12) United States Patent
Cai et al.

(10) Patent No.: US 12,664,751 B2
(45) Date of Patent: Jun. 23, 2026

(54) SYSTEMS AND TECHNIQUES TO PERFORM 4D-GUIDED VIDEO GENERATION WITH DIFFUSION MODELS

(71) Applicant: Adobe Inc., San Jose, CA (US)

(72) Inventors: Shengqu Cai, Stanford, CA (US);
Duygu Ceylan Aksit, London (GB);
Matheus Gadelha, San Jose, CA (US);
Chun-Hao Huang, San Jose, CA (US);
Yangtuanfeng Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 241 days.

(21) Appl. No.: 18/738,823

(22) Filed: Jun. 10, 2024

(65) Prior Publication Data

US 2025/0378674 A1 Dec. 11, 2025

(51) Int. Cl.
*G06V 10/44* (2022.01)
*G06T 7/40* (2017.01)
*G06T 7/50* (2017.01)
*G06V 10/771* (2022.01)

(52) U.S. Cl.
CPC .............. *G06V 10/44* (2022.01); *G06T 7/40* (2013.01); *G06T 7/50* (2017.01); *G06V 10/771* (2022.01)

(58) Field of Classification Search
CPC ........ G06V 10/44; G06V 10/771; G06T 7/40; G06T 7/50
See application file for complete search history.

(56) References Cited

U.S. PATENT DOCUMENTS

| | | | |
|---|---|---|---|
| 11,443,484 B2 * | 9/2022 | Vesdapunt | .............. G06T 17/00 |
| 2018/0295375 A1 * | 10/2018 | Ratner | ...................... G06T 7/12 |
| 2024/0119671 A1 * | 4/2024 | Liu | ........................... G06T 7/60 |

OTHER PUBLICATIONS

Songwei Ge et al., "Preserve your own correlation: A noise prior for video diffusion models," in ICCV, 2023, 12 pages.
Blattmann Andreas et al., "Align your latents: High-resolution video synthesis with latent diffusion models," in CVPR, 2023, 13 pages.
Ho Jonathan et al., "Imagen video: High definition video generation with diffusion models," in arXiv, 2022, 18 pages.
Ceylan Duygu et al., "Pix2video: Video editing using image diffusion," in ICCV, 2023, 12 pages.
Geyer Michal et al., "Tokenflow: Consistent diffusion features for consistent video editing," in arXiv, 2023, 13 pages.
Inbar Huberman-Spiegelglas et al., "An edit friendly ddpm noise space: Inversion and manipulations," in arXiv, 2023, 10 pages.
Elad Richardson et al., "Texture: Text-guided texturing of 3d shapes," in SIGGRAPH, 2023, 6 pages.

(Continued)

*Primary Examiner* — Ming Shui
(74) *Attorney, Agent, or Firm* — FIG. 1 Patents

(57) ABSTRACT

Embodiments include systems and techniques for receiving a prompt and an input mesh to generate a four-dimensional (4D) video and generating keyframes from a depth map and a UV coordinate map of the input mesh. Embodiments further include extracting features from the keyframes processed through a diffusion model, generating frames of the 4D video based on the prompt, UV-guided noise initialization of each object, and injecting the features extracted from each of the keyframes into the diffusion model and the prompt during a regeneration process.

20 Claims, 16 Drawing Sheets

(56)        References Cited

OTHER PUBLICATIONS

Po Ryan et al., "Compositional 3d scene generation using locally conditioned diffusion," in arXiv, 2023, 14 pages.
Poole Ben et al., "Dreamfusion: Text-to-3d using 2d diffusion," in ICLR, 2023, 20 pages.
Mildenhall Ben et al., "Nerf: Representing scenes as neural radiance fields for view synthesis," in ECCV, 2020, 8 pages.
Ho Jonathan et al., "Classifier-free diffusion guidance," in arXiv, 2022, 14 pages.
Zhang Lvmin et al., "Adding conditional control to text-to-image diffusion models," in ICCV, 2023, 12 pages.
Kass Michael et al., "Coherent noise for non-photorealistic rendering," in TOG, 2011, 5 pages.

* cited by examiner

630

---

Algorithm 1 Generative Rendering

---

Input: UV maps $\mathcal{UV} = [UV^1, ..., UV^N]$; depth maps $\mathcal{D} = [D^1, ..., D^N]$; text prompt $c$; diffusion model $\Phi$; projection from UV to image $\pi_{\mathcal{UV}}$; $T$ diffusion steps; $k$ keyframes $z_{\mathcal{UV}} \sim \mathcal{N}(0, \mathbf{I})$          // Sample noise in UV space
$\mathbf{z} = \mathbf{z}_T = \pi_{\mathcal{UV}}(z_{\mathcal{UV}})$
For $t = T, ..., 1$ do
    $KF = \text{shuffle}(\{i_1, ..., i_k\})$      // Sample keyframes
    $f_{KF}, F_{KF} \leftarrow \Phi(\mathbf{z}_{KF}, \mathcal{D}_{KF}, c)$    // Grab features from $\Phi$
    $\bar{T}_{KF} = \text{blend}(\pi_{\mathcal{UV}}^{-1}(F_{KF}))$   // Blends features in UV space
    $\mathbf{z}_{t-1} = [\,]$
    For $z^i$ in z do
       $\bar{F}^i = \pi_{UV^i}(\bar{T}_{KF})$
       $z_{t-1}^i = \Phi(z^i, \mathcal{D}_{KF}, c, f_{KF}, \bar{F}^i)$
       $\mathbf{z}_{t-1}.\text{append}(z_{t-1}^i)$
       $\mathbf{z} = \mathbf{z}_{t-1}$
Output: z

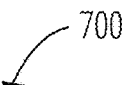

700

RECEIVE A PROMPT AND AN INPUT MESH TO GENERATE A FOUR-DIMENSIONAL (4D) VIDEO 702

DETERMINE, BY A RENDERER, A DEPTH MAP AND A UV COORDINATE MAP FROM THE INPUT MESH 704

DETERMINE, BY A DIFFUSION MODEL, A PLURALITY OF KEYFRAMES FROM THE DEPTH MAP AND THE UV MAP 706

DETERMINE, BY THE DIFFUSION MODEL, PRE-ATTENTION FEATURES AND POST-ATTENTION FEATURES FROM AT LEAST A SUBSET OF THE PLURALITY OF KEYFRAMES 708

PERFORM UV-GUIDED NOISE INITIALIZATION FOR EACH OBJECT IN THE INPUT MESH 710

GENERATE FRAMES FOR A FOUR-DIMENSIONAL (4D) VIDEO BASED ON THE PROMPT, THE UV-GUIDED NOISE INITIALIZATION, AND INJECTING THE PRE-ATTENTION FEATURES AND THE POST-ATTENTION FEATURES INTO THE DIFFUSION MODEL DURING A REGENERATION PROCESS PERFORMED ON NOISE IMAGES 712

FIG. 7

800

RECEIVE A PROMPT AND AN INPUT MESH TO GENERATE A FOUR-DIMENSIONAL (4D) VIDEO <u>802</u>

GENERATE KEYFRAMES FROM A DEPTH MAP AND A UV COORDINATE MAP, WHEREIN THE DEPTH MAP AND THE UV COORDINATE MAP ARE GENERATED FROM THE INPUT MESH <u>804</u>

EXTRACTING FEATURES FROM THE KEYFRAMES PROCESSED THROUGH A DIFFUSION MODEL <u>806</u>

GENERATE FRAMES OF THE 4D VIDEO BASED ON THE PROMPT, UV-GUIDED NOISE INITIALIZATION OF EACH OBJECT, AND INJECTING THE FEATURES EXTRACTED FROM EACH OF THE KEYFRAMES INTO THE DIFFUSION MODEL AND THE PROMPT DURING A REGENERATION PROCESS <u>808</u>

COMPUTER-READABLE STORAGE MEDIUM 1302

COMPUTER EXECUTABLE
INSTRUCTIONS 1304

SYSTEMS AND TECHNIQUES TO PERFORM 4D-GUIDED VIDEO GENERATION WITH DIFFUSION MODELS

BACKGROUND

Diffusion models are a class of mathematical models that describe the spread or movement of different entities within a system. They capture how particles, information, or features disperse and mix over time. Diffusion models can be used in various domains, such as computer vision, machine learning, physics, and social sciences. They are particularly useful in understanding and simulating complex systems with dynamic behaviors. One type of diffusion model is a Diffusion-based generative model. These models aim to learn and represent the underlying probability distribution of data. They transform an initial distribution, such as a Gaussian, into the target distribution by iteratively updating the data. This process allows for the generation of realistic samples from the target distribution. Diffusion models offer valuable insights into complex phenomena and have applications in tasks such as image synthesis, restoration, denoising, and data generation. Overall, diffusion models provide a powerful framework for understanding and simulating the dynamics of systems, allowing for the generation of realistic data and the analysis of complex phenomena.

BRIEF SUMMARY

Traditional 3D content creation tools empower users to bring their imagination to life by giving them direct control over a scene's geometry, appearance, motion, and camera path. Creating computer-generated videos, however, is a tedious manual process, which can be automated by emerging text-to-video diffusion models. Despite great promise, video diffusion models are difficult to control, hindering users from applying their own creativity rather than amplifying it. To address this challenge, embodiments are directed to systems and techniques that combine the controllability of dynamic 3D meshes with the expressivity and editability of emerging diffusion models. For this purpose, the approached discussed herein utilizes a mesh as input and injects the ground truth correspondence information obtained from the dynamic mesh into various stages of a text-to-image generation or diffusion model to output high-quality and temporally consistent frames.

Any of the embodiments discussed herein may be implemented as instructions stored on a non-transitory computer-readable storage medium and/or embodied as an apparatus with a memory and a processor configured to perform the actions described herein. It is contemplated that these embodiments may be deployed individually to achieve improvements in resource requirements and library construction time. Alternatively, any of the embodiments may be used in combination with each other in order to achieve synergistic effects, some of which are noted above and elsewhere herein.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6B illustrates an aspect of the subject matter in accordance with one embodiment.

FIG. 7 illustrates a routine 700 in accordance with one embodiment.

FIG. 8 illustrates a routine 800 in accordance with one embodiment.

DETAILED DESCRIPTION

Figure 1:
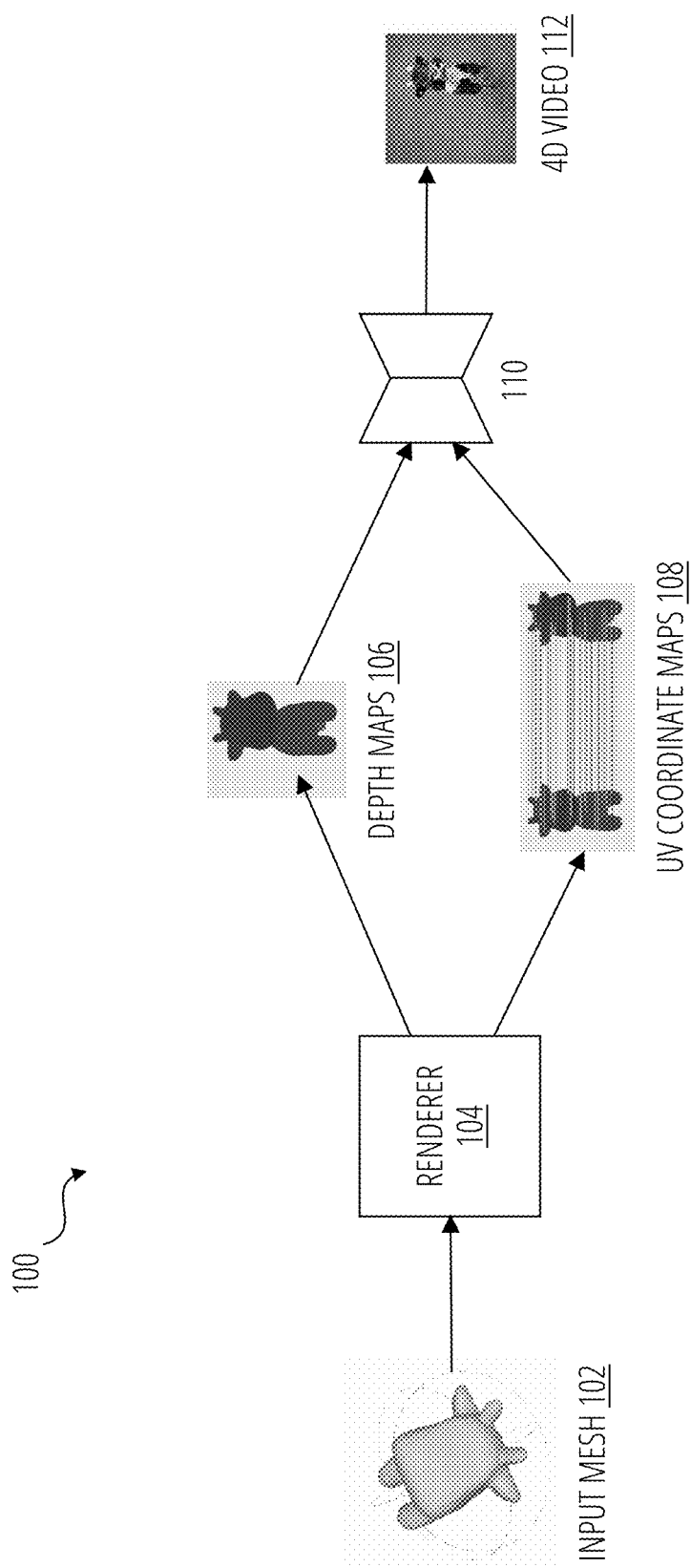
FIG. 1 illustrates an aspect of the subject matter in accordance with one embodiment.

Content creators traditionally rely on 3D content creation tools to render computer-generated videos. Unfortunately, existing 3D workflows are laborious, time-consuming, and require expertise. Emerging generative artificial intelligence tools, such as text-to-image (T2I) and text-to-video (T2V) models, solve these issues by automating many of the manual steps of traditional workflows. However, video generation is difficult to control because it is not easily possible to specify scene layout and motion in a temporally consistent manner.

Recent approaches have attempted to control diffusion models. For example, ControlNet uses a pre-trained T2I diffusion model and finetunes an adapter network conditioned on depth, pose, or edge images to manage the layout. This strategy successfully generates individual frames but results in flicker for video generation. Other approaches aim to learn the complex types of motions encountered in natural videos directly. While successful in generating smooth motions, these approaches are not easily controllable. Finally, video-to-video diffusion models enable editing and stylization, but they require high-fidelity video as input, which is not always available.

Systems and methods discussed herein combine the power of 3D workflows with T2I models for generating 4D-guided stylized animations. Specifically, embodiments are directed rapidly prototyping proxy geometry and motion of a scene (e.g., camera paths, physically based simulation, or character animation) while utilizing the T2I generation model as a renderer to output final stylized animations. The system and method determine and leverage ground truth 4D spatiotemporal correspondences that can be obtained from an animated 3D scene to guide an image generation process. The system outputs a 4D video that includes animation from a viewpoint.

In embodiments, the systems and methods determine correspondence information from an input mesh, and the correspondence information is used to perform noise initialization to provide temporal consistency. Specifically, the systems and methods utilize the canonical representation (i.e., UV space) of the 3D scene of the input mesh to initialize random noise, which is then projected to each frame of the animation. Further, embodiments include identifying attention features by enriching the self-attention layers of a diffusion model, which contain spatial appearance information vital for obtaining consistent renderings. For example, systems and methods propagate both the input and output of self-attention layers across the frames via known correspondences to enforce consistent results. Additionally, the systems and methods utilize depth cues rendered from the 3D scene in conjunction with control models to provide structure guidance. In summary, embodiments include a framework that uses a pre-trained T2I diffusion model as a multi-frame renderer that can capture the correspondences while maintaining high-fidelity and consistent generations.

Improvements over previous solutions include a new framework for 4D-guided animation synthesis utilizing the pre-trained T2I generation models as a multi-frame renderer. Embodiments further enhance the self-attention layers of the image generation model by performing correspondence-aware blending of input and output features to enforce consistent appearance synthesis and introduce a UV-space noise initialization mechanism. Combined with the correspondence-aware attention mechanism, the UV-space noise initialization enables better consistency across frame generations. Although exemplary embodiments are described with a particular AI or ML system, e.g., 2D generation models such as Stable Diffusion®, the principles described herein can also be applied to other machine learning systems. Embodiments are not limited in this context.

FIG. 1 illustrates an example of system 100 to convert creator-defined scene-level proxy meshes directly to 4D animation. In embodiments, the input mesh 102 is a scene composed of meshes. The input mesh 102 is processed through a renderer 104, such as a 3D renderer, to generate depth maps 106 and UV coordinate maps 108 (correspondences) for the input mesh 102 and its' objects. The depth maps 106 and UV coordinate maps 108 are provided as guiding channels and a prompt to the diffusion model 110 to generate the 4D video 112.

In embodiments, the input mesh 102 is a scene-level proxy image that includes digital representations of three-dimensional objects or surfaces represented as meshes. Digital representations are simplified stand-ins or substitutes for complex and detailed objects or environments in a computer graphics scene. A scene-level proxy mesh typically includes a reduced level of detail and complexity of original objects or environments while preserving their overall shape and structure so that it can be processed more quickly by renderer 104.

In embodiments, the renderer 104 processes the input mesh 102 to generate depth map(s) 106. For example, the renderer 104 loads or determines the input mesh 102 in the renderer's memory. Further, the renderer 104 determines the defined virtual camera's position and orientation. In some instances, the position and orientation of the camera are specified by a user using a user system. The renderer 104 processes the input mesh 102, including projecting the input mesh's 102 objects onto a 2D plane (the image plane) from the camera's perspective to create a 2D representation of the input mesh 102. The renderer 104 then performs depth value calculations for each object by calculating the distance of the object's vertex to the camera along the camera's viewing direction. The renderer 104 normalizes this distance to a range of 0 (closest) to 1 (farthest) and stores these values as the corresponding pixel's intensity the in depth maps 106. The depth maps 106 are represented as $D=[D^1, \ldots, D^N]$, where N is the sequence length. The depth maps 106 and UV coordinate maps 108 are used to generate images that depict a stylized animation.

The renderer 104 generates the UV coordinate maps 108 or texture coordinates by assigning 2D coordinates to the vertices of the meshes (objects). The process includes the renderer 104 performing a UV unwrapping process, e.g., unwrapping the 3D meshes into a 2D space. For example, the renderer 104 peels off the surface of a 3D object along 'seams' and lays it flat on a 2D plane. The renderer 104 then performs a UV mapping process where UV coordinates are assigned to each vertex of the mesh. These coordinates determine how textures are applied to a surface. UV coordinate maps 108 are typically expressed as (u, v) values, with (0, 0) being the bottom-left corner and (1, 1) being the top-right corner of the texture; however, embodiments are not limited in this manner. Once generated by the renderer 104, the renderer 104 stores, in storage, the UV coordinate maps 108 as $UV=[UV^1, \ldots, UV^N]$, where N is the length of the sequence, and each UV map contains 2D texture coordinates as well as an object ID in its red, green, blue (RGB) channels.

In embodiments, the depth maps 106 and the UV coordinate maps 108 along with a text prompt are injected into the diffusion model 110 to render the 4D video 112, e.g., the output animation. The diffusion model 110 processes the inputs through a diffusion process to add noise to the images (keyframes) and a reverse diffusion process, i.e., an inference process, to generate one or more new images using the prompt, the depth maps 106, and UV coordinate maps 108 as guide rails during the image generation process. As will be discussed in more detail in the following description, the process is further improved by determining or generating keyframes from the input mesh 102 and determining pre-attention and post-attention features while processing the keyframes to blend and feedback into the regeneration process. Additionally, the UV noise is initialized, which further enables better consistency across frame generation. FIG. 2 through FIG. 5 discuss these additional features in more detail.

Figure 2:
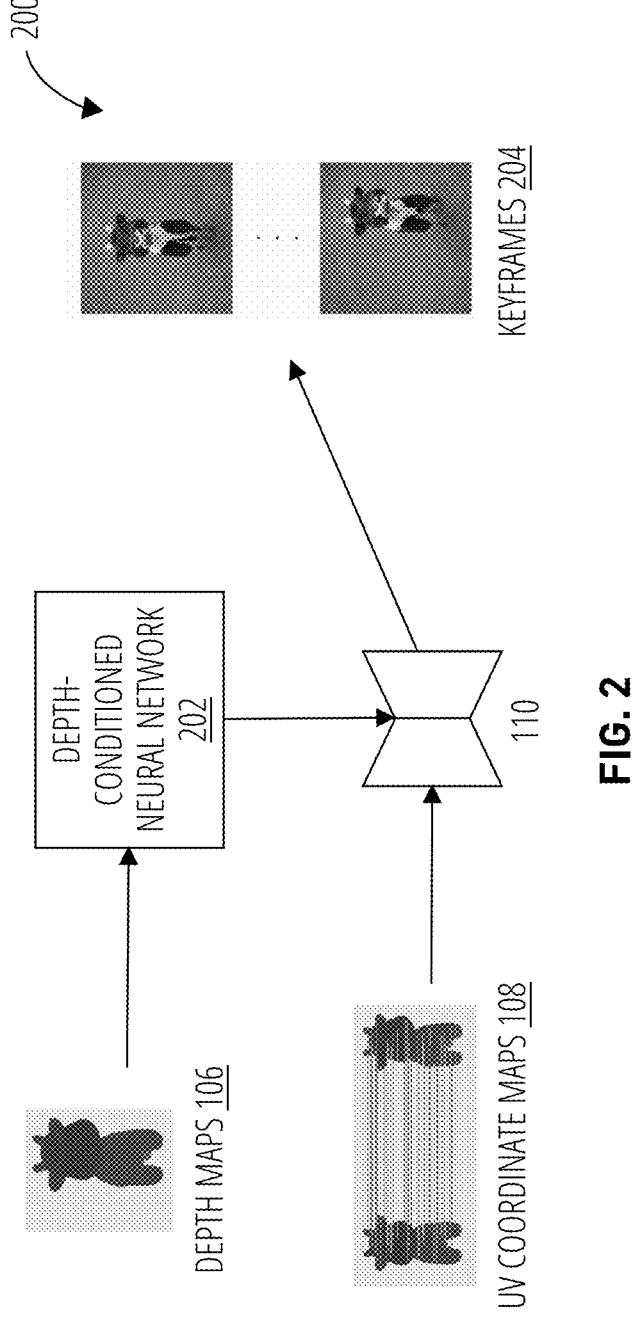
FIG. 2 illustrates an aspect of the subject matter in accordance with one embodiment.

FIG. 2 illustrates an example system 200 in accordance with the embodiments discussed herein. Specifically, system 200 illustrates one configuration to generate keyframes from a depth map 106 and UV coordinate maps 108 of an input mesh 102. The depth maps 106, and in some instances, the UV coordinate maps 108 are processed through a depth-conditioned neural network 202, and diffusion model 110 to generate a batch of keyframes using extended attention. The diffusion model 110 generates a set of keyframes that are relatively consistent and also have large intervals that can overlook certain inconsistencies.

In embodiments, the depth-conditioned neural network 202 enables the diffusion model 110 to process the depth maps 106 and UV coordinate maps 108. Specifically, the depth-conditioned neural network 202 enables the diffusion model 110 to accept conditional inputs, including the depth maps 106 and UV coordinate maps 108, and guides the diffusion model 110 image generation process to generate the keyframes 204. Further, utilizing the depth-conditioned neural network 202 with the diffusion model 110 enables the diffusion model 110 to generate the keyframes with diverse visual outcomes. In one example, the depth-conditioned neural network 202 is ControlNet® and is used with the Stable Diffusion® model. The depth-conditioned neural network 202 enables the incorporation of spatial conditioning controls by preserving the diffusion model's weights, ensuring its stability and quality. Further, the depth-conditioned neural network 202 leverages the diffusion model 110 deep encoding layers as a backbone for learning new controls. In some instances, the depth-conditioned neural network 202 introduces "zero convolutions"—layers initialized with zeroes that gradually grow parameters during training. This safeguards against harmful noise and ensures smooth integration of controls when generating the keyframes. The depth-conditioned neural network 202 supports a wide range of conditioning controls, including, but not limited to, edges, depth, segmentation, human pose, style transfer, object placement, image similarity, etc.

The diffusion model 110 generates the keyframes based on the conditional information, e.g., the depth maps 106, the UV coordinate maps 108, and prompt by performing the diffusion process and denoising process. The diffusion process adds varying degrees of noise to the latent representation to generate noisy images, and the denoising process includes iteratively denoising the noisy images, generating multiple keyframes. The diffusion model 110 performs keyframe sampling by controlling the noise patterns to achieve specific effects, e.g., movement, style variation, and perspective changes. The diffusion model 110 outputs a set of keyframes that represent diverse variations of the input image. Specifically, the diffusion model 110, during reverse diffusion, gradually removes the noise, but instead of reconstructing the original image, the diffusion model 110 steers the reconstruction towards the desired keyframes. The diffusion model 110 integrates the prompt, depth maps 106 and UV coordinate maps 108 to shape the keyframes appropriately. In some instances, the diffusion model 110 changes the scene, adds or alters elements, creates a progression of images that tell a story or depict motion, etc. The diffusion model 110 refines each keyframe to ensure they are coherent and align with the overall theme or narrative.

Figure 3:
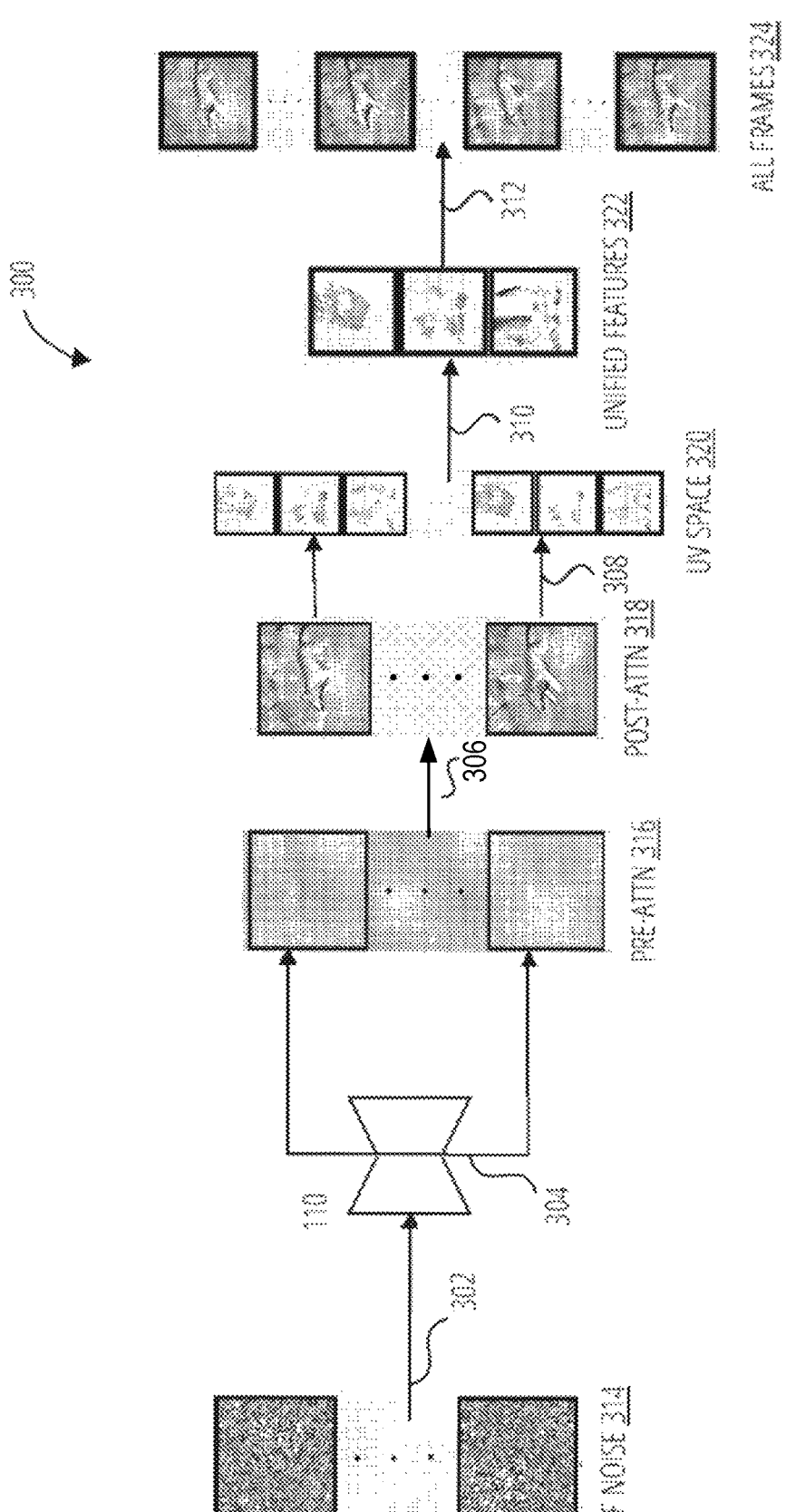
FIG. 3 illustrates an aspect of the subject matter in accordance with one embodiment.

The diffusion model 110 processes the keyframes, including determining pre-attention features and post-attention features to blend as part of the regeneration process when generating the full 4D video. In embodiments, the diffusion model 110 performs feature blending over the input and output features of self-attention modules of the diffusion model 110. The diffusion model 110 also performs UV-guided noise initialization to improve temporal consistency. FIG. 3 illustrates an example diffusion flow 300 and framework to perform feature extraction from the keyframes. The diffusion model 110 performs the diffusion process to generate noise in the keyframes, e.g., keyframes noise 314. The diffusion model 110 network is extended to process multiple frames jointly where they can attend to each other's features. Further, the diffusion model 110 manipulates a self-attention module's input and output features to further enforce consistency.

At line 302, the diffusion model 110 performs the diffusion process, e.g., generates noise in the generated keyframes. The diffusion model 110 injects noise into the keyframes through a multistage process to generate the keyframes noise 314 for each of the keyframes. During the process, the diffusion model 110 extracts features. At line 304, the diffusion model 110 extracts pre-attention features 316. For example, the diffusion model 110 includes processing with an attention module(s) or extended attention, which is defined:

$$F = Attn(Q; K; V) = \text{Softmax}\left(\frac{QK^T}{\sqrt{d}}\right).$$

V, where Q, K, and V denote the query, key, and value features, respectively. The Q, K and V are computed by projecting the same features $f^{(i,l)}$, via the corresponding attention matrices, $Q^{(i,l)} = W^Q f^{(i,l)} = W^K f^{(i,l)}$, $V^{(i,l)} = W^V f^{(i,l)}$, where i denotes the frame index and l denotes the diffusion step, and $W^{Q/K/V}$ are weight matrices for query, key, and values, respectively. In other words, for each query feature, an attention weight is computed based on the similarity between the query and each key feature. Then, the value features are combined based on the attention weight. In embodiments, the input features can be manipulated, e.g., the pre-attention features 316 provided to the self-attention module, specifically the key and value features. For example, when generating N frames, one option is to perform extended attention where the features $f^{(i,l)}$ of all the frames are concatenated and utilized as key and value pairs:

$$K^{(i,l)} = W^K \left[f^{(1,l)}, \ldots, f^{(N,l)}\right], \qquad \text{Standalone Eq. 1}$$
$$V^{(i,l)} = W^V \left[f^{1,l}, \ldots, f^{(N,l)}\right].$$

Extended attention is sometimes a synchronized operation performed, and all frames attend to each other's features, resulting in a more consistent generation. However, generating multiple frames together incurs a high computational cost. Thus, in other cases, extended attention is used to create a subset of frames, e.g., the keyframes, and the keyframe features are propagated to the rest of the sequence.

In addition to manipulating the input of the self-attention layer, the output can also be directly manipulated, e.g., post-attention feature injection. At 306, the diffusion model 110 identifies or determines post-attention features 318, the outputs of a particular attention layer or module. In particular, given known correspondences between two frames i and j, the diffusion model 110 can reproject $F^{(i,l)}$, the output of the self-attention module of frame i at diffusion step l, to obtain: $F^{(j,l)} = \pi_{i,j}(F^{(i,l)})$, where $\pi_{i,j}$ denotes the re-projection operation, which is enabled by the ground truth pixel-level correspondences between frames given by UV coordinate maps 108.

In embodiments, the diffusion model 110 manipulates the pre-attention features 316 and post-attention features 318 of the self-attention module to enhance consistency. In one example, the diffusion model 110 manipulates the pre-attention features 316 and post-attention features 318 guided by ground truth correspondences from the 3D scene. Specifically, the diffusion model 110 utilizes the canonical UV space to bring the features from the different frames into correspondence, e.g., performs UV-space feature blending. For example, the diffusion model 110 processes a set of feature maps for each frame i, and projects them to a canonical UV space. In particular, for each texel in the UV space, the diffusion model 110 determines its closest point correspondence in each frame. In some instances, the diffusion model 110 determines the average to blend the features after determining the correspondences from multiple frames. Further, the diffusion model 110 performs the blending sequentially and fills a certain texel with the features of its corresponding pixel in a frame if it has not been filled before to avoid over-smoothing of the features. The final unified texture is then the mean of the inpainted texture and the average texture.

The diffusion model 110 further determines a UV-space feature map $T^{(i,l)}$ based on all the features from all frames being blended. The diffusion model 110 projects the UV-space feature map back to each frame to obtain $\bar{f}^{(i,l)}$.

Thus, in summary and during the image generation process, t$\widehat{F}^{(i,l)}$ the diffusion model 110, for each diffusion step, samples a random batch of m keyframes and performs extended attention on these keyframes, extracting both their pre-attention features 316 denoted as $$f_{KF}^{(i,l)}$$

and the post-attention features 318 denoted as $$F_{KF}^{(i,l)}.$$

In addition, the UV space feature map is denoted as $\bar{T}_{KF}^{l}$, by blending $$f_{KF}^{(i,l)},$$

as described previously. In some instances, the diffusion model 110 performs a diffusion step on all the frames sequentially; in the case of keyframes, the diffusion step is repeated. For each frame, the diffusion model 110 composes the pre-attention features 316 by concatenating the pre-attention features 316 of the keyframes, $$f_{KF}^{l} = \left[ f_{KF}^{(1,l)}, \dots, f_{KF}^{(m,l)} \right],$$

with the pre-attention features 316 of the current frame $f^{(i,l)}$ resulting in:

$$K^{(i,l)} = W^{K}\left[ f^{(i,l)}, f_{KF}^{l} \right], \; V^{(i,l)} = W^{V}\left[ f^{(i,l)}, f_{KF}^{l} \right] \quad \text{Standalone Eq. 2}$$

Figure 4:
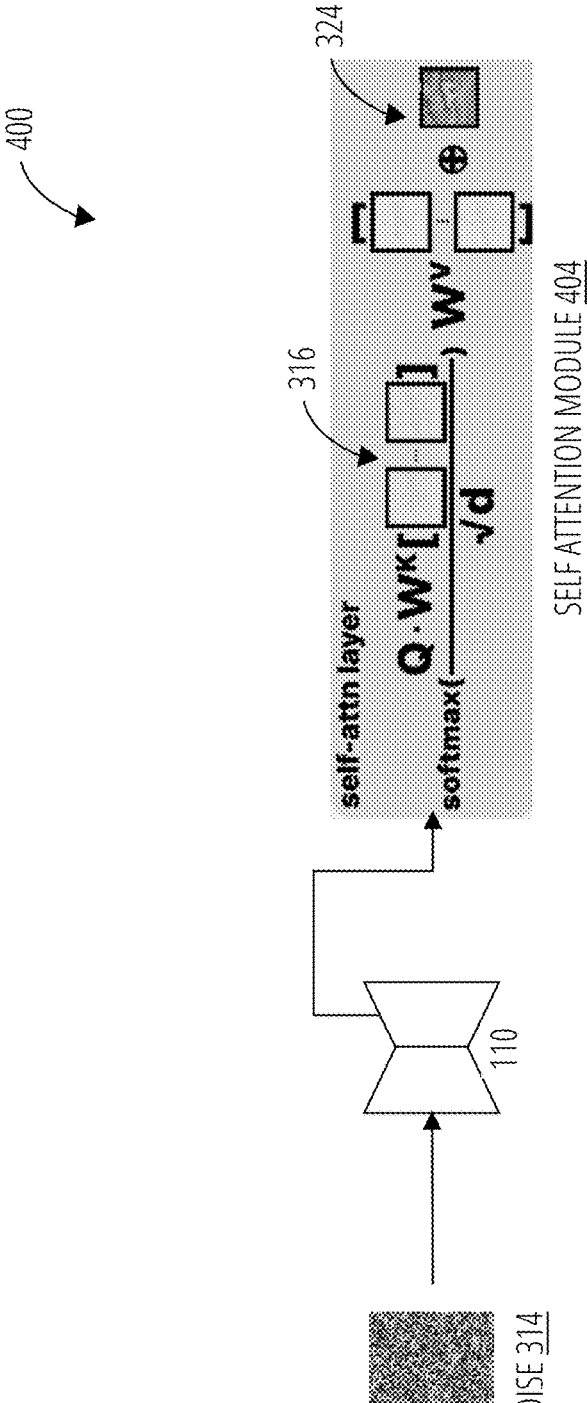
FIG. 4 illustrates an aspect of the subject matter in accordance with one embodiment.

FIG. 4 illustrates a more detailed regeneration flow 400 showing injection of the pre-attention features 316 and all frames 324 into the self attention module 404. After executing the self attention module 404, the diffusion model 110 blends the output, i.e., post-attention features 318 of the current frame $\widehat{F}^{(i,i)}$, with the projection of the blended post-attention features 318 to the current frame $\bar{F}^{(i,l)}$. Hence, the updated output of the module becomes:

$$F_{out}^{(i,l)} = \alpha \cdot \bar{F}^{(i,l)} + (1 - \alpha) \cdot \hat{F}^{(i,l)} \quad \text{Standalone Eq. 3}$$

where $\widehat{F}^{(i,l)}$ is the output of the inflated self-attention block computed using keys and values in Eq. 5. With reference back to FIG. 3, at lines 308 and 310, the diffusion model 110 projects the post-attention features 318 to the UV space 320 and generates unified features 322, as described above. Finally, at line 312, all frames 324 are generated using a weighted combination of the outputs of the extended attention with the pre-attention features of the keyframe and the UV-composed post-attention features from the keyframes.

Figure 5:
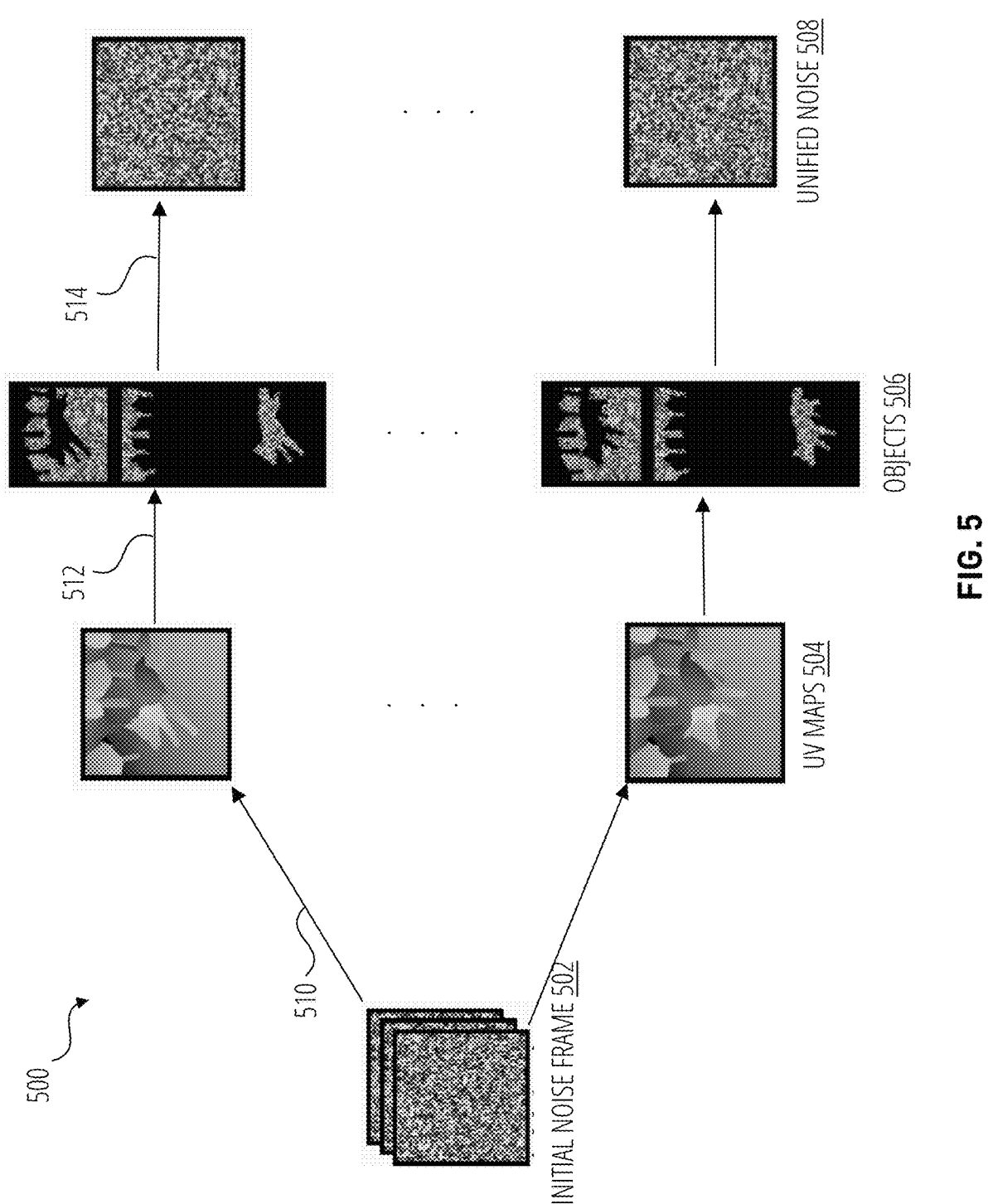
FIG. 5 illustrates an aspect of the subject matter in accordance with one embodiment.

In some embodiments, noise initialization is utilized to provide better consistency across frame generation performed by the diffusion model 110. FIG. 5 illustrates an example system 500 and process flow to provide UV-space noise initialization. System 500 utilizes the canonical UV space by initializing the noise in this space and creates a Gaussian noise texture. The system 500 projects the noise to each frame by using the frame-UV correspondences.

Specifically, at 510, the system 500 processes an initial noise frame 502 in the UV space and identifies each object in the initial noise frame 502 based on the UV maps 504. In some instances, the initial noise frame 502 is a noisy keyframe. At 512, the objects 506 are identified, and noise is initialized for each object to generate a unified noise 508 frame at 514. The unified noise 508 is further processed by the diffusion model 110 during the diffusion process to generate rendered clear frames to provide animation.

In this approach, the system 500 utilizes the UV coordinates of an object's surface as a guiding factor in generating and applying noise patterns to develop the unified noise. As mentioned, the UV coordinates represent a mapping of a 2D texture to the surface of a 3D object, defining how the texture is wrapped and applied. The UV-guided noise initialization takes advantage of this mapping information to ensure that the generated noise aligns with the object's surface and respects its texture layout. Using UV guidance, the noise patterns can be accurately applied to specific areas of an object, considering its geometry and texture mapping. This allows system 500 to generate more precise and realistic variations in surface details, such as bumps, scratches, or imperfections, which can significantly enhance the object's visual appeal during regeneration.

In some instances, the system 500 enables users to manipulate the UV coordinates and adjust the noise generation parameters to achieve a desired visual effect. The result is an object with improved texture realism, finer details, and a more natural overall appearance. Overall, UV-guided noise initialization for objects enhances the quality and authenticity of frames in an amination and improves temporal consistency.

Figure 6A:
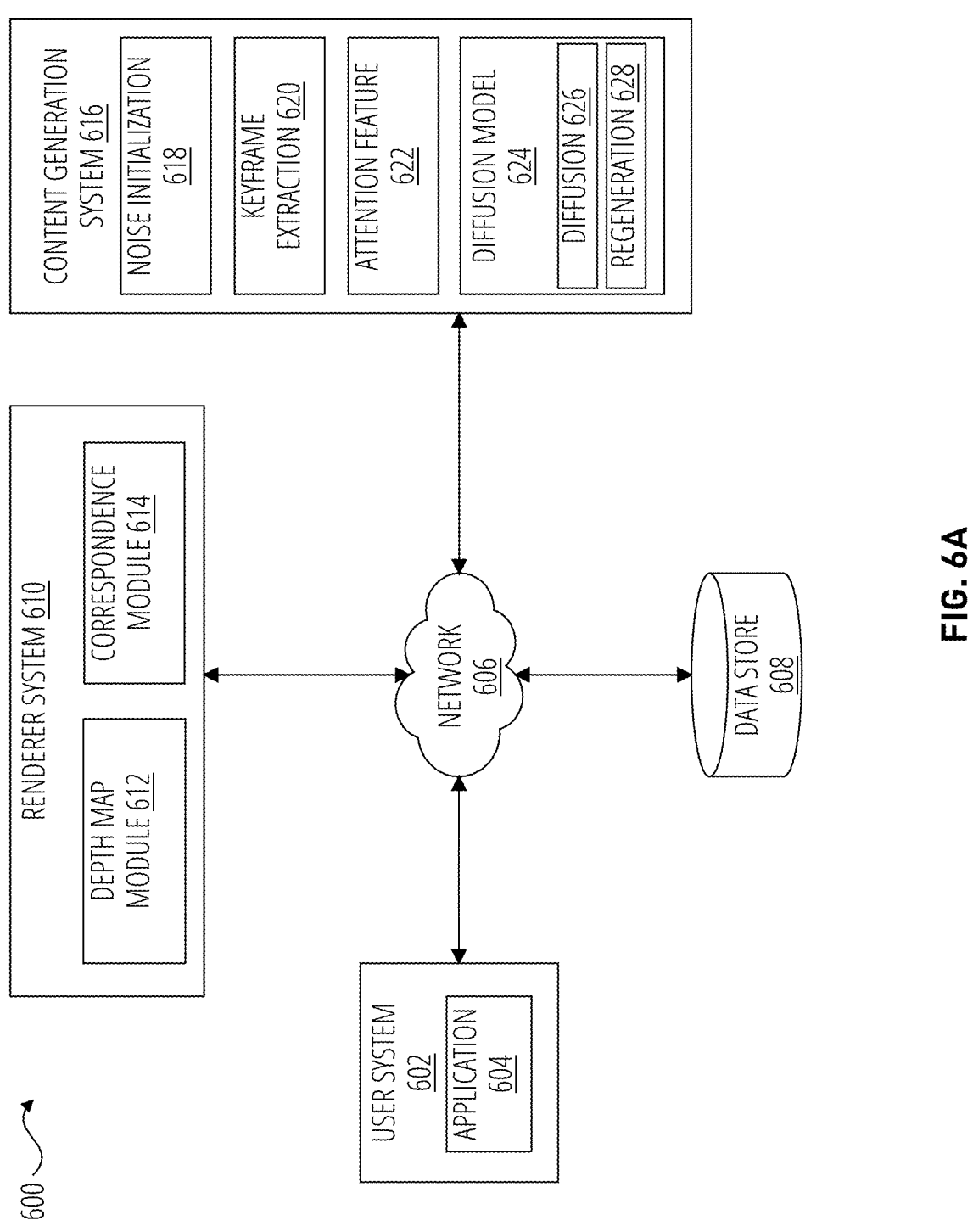
FIG. 6A illustrates an aspect of the subject matter in accordance with one embodiment.

FIG. 6A illustrates an example system 600 in accordance with the embodiments discussed herein. Specifically, system 600 is one example of a configuration to perform 4D video generation from a single input mesh and a prompt, e.g., a text prompt or an image prompt.

The system 600 includes a user system 602, a renderer system 610, and a content generation system 616, coupled via a network 606. In addition, each system is coupled with a data store 608. The user system 602 includes hardware and software components that collectively enable an individual or a group of individuals to interact with and utilize a computer or digital device with system 600. It encompasses the tools, interfaces, and functionalities that allow users to perform tasks, access information, and communicate with the systems 600. The hardware components of the system 600, includes but are not limited to, devices such as personal computers, laptops, smartphones, tablets, or any other electronic device that enables user interaction. These devices provide the physical means for users to input commands, receive output, and interact with the software.

On the software side, the user system 602 includes the operating system, applications, and user interfaces that facilitate user interaction. The operating system manages the hardware resources and provides a platform for running applications. Applications 604 known as software programs or apps, are designed to perform specific tasks or provide certain functionalities to the user. User interfaces, such as graphical user interfaces (GUIs) or command-line interfaces (CLIs), allow users to interact with the system, issue commands, and receive feedback. In summary, the user system 602 encompasses the combination of hardware and software components that enable users to interact with and utilize a computer or digital device, providing them with the tools and functionalities to perform tasks and access information with system 600.

In one example, the user system 602 includes one or more applications 604 to receive or generate input meshes 102 and prompts from a user. The user system 602 provides the input meshes 102 and prompts to the systems of system 600 to create 4D video and animations. In one example, the user system 602 sends information to the other systems via network 606. Network 606 is a computing network system or infrastructure that enables computers and other devices to communicate and share resources. The network 606 involves the interconnection of multiple devices, such as computers, servers, routers, switches, and other networking equipment, allowing them to exchange data, information, and resources. In embodiments, the network 606 includes a local area network (LAN), and/or a wide area network (WAN) spanning multiple locations or even globally.

In a network 606, devices are linked together through wired or wireless connections, forming a network infrastructure. The network 606 enables the transmission of information over long distances, connecting devices and users across geographically dispersed areas. The network 606 can include Ethernet, Wi-Fi, cellular networks, or the internet itself. Different portions of the network 606 can be configured in different topologies, including star, bus, ring, or mesh, to meet specific requirements and provide efficient data transmission and connectivity. In addition to communication and resource sharing, computing networks offer security, data storage, and network management services. The network 606 operates by network protocols and standards that govern the rules and procedures for data transmission, ensuring compatibility and interoperability between different devices and systems within the network 606.

In embodiments, the system 600 includes one or more data stores 608 to store data for the system 600 and systems therein. In embodiments, the data store 608 is a structured and organized storage system used to store and manage data. In some instances, it is a repository specifically designed to store and retrieve data to facilitate efficient access, efficient data retrieval, and data integrity for user system 602, renderer system 610, and/or content generation system 616.

The data store 608 can take various forms depending on the specific requirements of the systems. It can be a file or database on a single computer, or it could be a more complex distributed storage system spread across multiple servers or a cloud-based storage system. The data store 608 provides a reliable and scalable solution for storing data. It includes mechanisms for creating, reading, updating, and deleting data (commonly referred to as CRUD operations). The data store 608 also offers features for searching, querying, and indexing data to support efficient retrieval and analysis. The data store 608 can be different types based on structure or functionality. For example, sometimes, the data store 608 includes relational databases to store data in tables with predefined schemas and support SQL (Structured Query Language) for querying and manipulation. In other instances, data store 608 includes NoSQL databases, which offer flexibility in data models and scale horizontally to handle large volumes of data. In some instances, the data store 608 is a specialized data store for a specific purpose, such as key-value stores, document databases, graph databases, and more. For example, the data store 608 stores data, such as input meshes, prompts, 4D video output, depth maps, UV coordinate maps, in-flight data, data for a large language data model such as a diffusion model discussed herein, etc.

In embodiments, the system 600 includes a renderer system 610 including a depth map module 612, and a correspondence module 614 to process input meshes, and generate depth maps and UV coordinate maps. The renderer system 610 includes software or hardware components, including the depth map module 612 and correspondence module 614, that are responsible for generating outputs, such as depth maps and UV coordinate maps. The renderer system 610 takes input data, such as an input mesh, and transforms or generates the desired outputs, which in embodiments discussed herein include depth maps, and UV coordinate maps. In one example, the renderer system 610 includes or is a diffusion model that includes the depth map module 612 and the correspondence module 614 configured to generate the depth maps and the UV coordinate maps, respectively.

The input, such as the input mesh, includes a 3D geometric representation of objects and surfaces that serves as input data. The input mesh includes a collection of vertices, edges, and faces that define the shape and topology of the object(s) and surface(s). In embodiments, a user utilizing the user system 602 can generate or provide the input mesh using different methods, including manual modeling, 3D scanning, or procedural generation. Once the mesh is created or obtained, it can be used as input for various purposes, such as rendering, simulation, animation, or analysis. In embodiments discussed herein, the input mesh is processed by the depth map module 612 to generate depth maps, and the correspondence module 614 generates UV coordinate maps.

In embodiments, the depth map module 612 processes the input mesh, i.e., the input mesh, to generate the depth maps by performing several operations. For example, the depth map module 612 configures the rendering environment, including the rendering engine, shaders, lighting, and camera parameters. In one example, these configurations are made by a user of the user system 602, providing inputs to the renderer system 610. In another example, the configurations may be delivered via a pre-setting, file, default setting, etc.

The depth map module 612 loads the input mesh into the rendering system, e.g., into the memory (not shown) of the renderer system 610. In one example, the 612 imports the mesh data into the rendering pipeline and associated memory, including vertex positions, normals, and face indices. In some instances, the depth map module 612 assigns materials and textures. For example, if the input mesh has associated materials or textures, the depth map module 612 assigns them to the corresponding mesh parts. The depth map module 612 further configures the rendering pipeline to generate depth maps. For example, the depth map module 612 sets up a frame buffer designed to store the depth values of rendered pixels and configures the rendering technique to capture depth information during the rendering process.

In embodiments, the depth map module 612 renders the input mesh in the configured environment and with the specified parameters. Specifically, the depth map module 612 projects the mesh onto the screen space, rasterizing the geometry, applying lighting calculations, and rendering the pixels of the depth buffer. After rendering the scene, the depth map module 612 retrieves the depth values of each pixel from the depth buffer and stores them in a suitable data structure, e.g., data store 608. In some instances, the depth map module 612 performs post-processing, such as applying filters, transforming the depth values, or converting them to a desired format or coordinate system. In embodiments, a depth map, also known as a Z-buffer, is a two-dimensional image or buffer that stores depth values for pixels in a rendered scene. The depth value represents the distance from the camera viewpoint to a specific point in the scene.

In embodiments, the renderer system 610 includes a correspondence module 614 to generate UV coordinate maps. As discussed above, the correspondence module 614 performs several operations to create the UV coordinate maps. Note that one or more of the following operations may have been previously performed when generating the depth maps. For example, and as discussed above, the correspondence module 614 configures the rendering environment with the appropriate rendering engine, shaders, lighting, and camera parameters if it has not already been done. Additionally, the correspondence module 614 can also import the input mesh data, including the vertex positions, vertex normals, texture coordinates (UVs), and face indices, into the memory of the renderer system 610. In some embodiments, the correspondence module 614 ensures the mesh is constructed correctly with no missing faces or corrupted geometry when loading it into the system. The correspondence module 614 processes the input mesh and first identifies the seams, e.g., decides where the seams (cuts) will be cut to lay flat. Strategic seam placement is crucial for minimizing distortion. The correspondence module 614 marks or stores indications where these seams are on the mesh. This step helps guide the UV unwrapping process.

The correspondence module 614 performs an unwrapping process. Specifically, the correspondence module 614 'cuts' the mesh along the seams and lays out the faces flat in a 2D space. This process maps each vertex in 3D to a coordinate in 2D UV space. The correspondence module 614 may then adjust the UV layout. For example, the initial unwrap might not be perfect and the correspondence module 614 adjusts the layout to minimize stretching, avoid overlapping, and utilize the UV space efficiently. Next, the correspondence module 614 generates the UV map, e.g., a 2D representation where each point corresponds to a point on the 3D model and exports the UV Layout, e.g., stores the UV coordinate map in the data store 608. In embodiments, the UV coordinate map may also be known as a UV map and is a two-dimensional texture coordinate system applied to the surface of a 3D model, e.g., the input mesh or input. It maps points on the model's surface to corresponding points on a 2D texture image. UV coordinates provide a way to specify how a texture should be wrapped or applied to the model, allowing for precise texturing of complex 3D surfaces when generating the 4D video.

A depth map and a UV coordinate map are different data types that can be generated as outputs. The depth map represents the depth information of a rendered scene, while the UV coordinate map provides information about how textures are mapped onto the model's surface. In embodiments, the content generation system 616 utilizes the depth maps and UV coordinate maps along with a prompt to generate the 4D video, for example. At a high level, the content generation system 616 generates keyframes and processes the keyframes through a diffusion process. Specifically, the content generation system 616 provides a framework for 4D-guided animation synthesis utilizing a text-to-image model as a multi-frame renderer. Further, the content generation system 616 provides enhanced self-attention layers processing by performing correspondence-aware blending of both input and output features to enforce consistent appearance synthesis, as described above in FIG. 3 and FIG. 4. In addition, the 616 includes a UV-space noise initialization mechanism that, when combined with the correspondence-aware attention mechanism, enables better consistency across frame generations.

In embodiments, the content generation system 616 includes a noise initialization module 618, a keyframe extraction module 620, an attention feature module 622, and a diffusion model 624, further includes a diffusion module 626 and regeneration module 628. The noise initialization module 618 performs the noise initialization operations discussed herein, the keyframe extraction module 620 extracts keyframes as discussed herein, and the attention feature module 622 enables input and output feature injection.

The diffusion model 624 is a text-to-image (T2I) diffusion model. This specific computational model focuses on generating image content from textual input, image input, and other guide rails, as discussed herein. The diffusion model 624 simulates transforming text descriptions into corresponding visual representations. In one example, the diffusion model 624 leverages deep learning techniques, such as generative adversarial networks (GANs) or variational auto-encoders (VAEs), to learn the mapping between textual input and image output. For example, the diffusion model 624 is trained on large datasets containing paired examples of text descriptions and corresponding images. By learning the patterns and correlations between textual and visual data, the diffusion model 624 gains the ability to generate realistic and coherent images given a textual input.

In one embodiment, the diffusion model 624 utilizes the Stable Diffusion® model. In embodiments, the diffusion model 624 receives inputs, such as a text prompt. The text prompt 'tells' the model what image to generate. The prompt can be any textual description, including keywords, phrases, sentences, or poems. The more detailed and specific the prompt is, the more likely it is that diffusion model 624 will generate an image that matches the user's expectations. In some instances, the diffusion model 624 receives a latent seed or a random noise tensor that initializes the image generation process. While the text prompt guides the overall content of the image, the latent seed determines the specific details and variations. Even with the same text prompt, different seeds can lead to significantly different images.

In addition, the diffusion model 624 receives an input mesh to help guide the diffusion model 624 during the generation process. As described above, the input mesh is used to generate depth maps and UV coordinate maps, which are provided as input guiding channels to the diffusion model 624. In one example, the diffusion model 624 receives the maps from the renderer system 610 to process with the prompt. Guiding or conditioning channels influence specific aspects of the image-generation process. They are additional input channels that provide information to the model, directing it towards specific desired features or styles. For example, depth maps represent the distance from the camera to each point in the scene, allowing you to create 3D effects. Similarly, the UV coordinate maps guide the placement and application of textures onto 3D models. Further, they provide the diffusion model 624 a roadmap for how the textures should be applied to the model. By aligning the UV coordinates of the model with the corresponding coordinates on the texture image, the mapping ensures that the textures are correctly aligned and applied to the appropriate areas on the model's surface. Using UV maps to guide the texture application allows for greater control and accuracy in placing textures, ensuring that they conform correctly to the 3D model's shape and features.

At a high level, the diffusion model 624 performs two main processes to generate multiple frames. Specifically, the diffusion module 626 performs a forward diffusion process, and the regeneration module 628 conducts a regeneration or reverse diffusion process. The diffusion module 626 adds noise to keyframes during the forward diffusion process. Specifically, for each diffusion step, the diffusion module 626 utilizes the attention feature module 622, e.g., extended attention, on the set of keyframes and extracts their pre-attention features and post-attention features. In embodiments, one or more keyframes are determined from the input mesh by the keyframe extraction module 620 during a keyframe generation process, as discussed above in FIG. 2.

The regeneration module 628 performs a reverse diffusion or regeneration process where a noisy frame is generated into one or more frames of the 4D video. Embodiments discussed further utilize a noise initialization process to initialize noise for objects within the original input mesh. In one example, the noise initialization module 618 initializes the noise in the UV space of each object, which we then render into each image during the regeneration process. Further, regeneration module 628 generates all the frames using a weighted combination of the extended attention outputs with the keyframe's pre-attention features and the UV-composed post-attention features from the keyframes.

In embodiments, the system 600 and its components perform operations to generate an animation or 4D video from a single input mesh. FIG. 6B illustrates one example algorithm performed by the content generation system 616 to generate the 4D video from the input mesh. In one example implementation, the content generation system 616 is configured with Stable Diffusion® model and a depth-conditioned ControlNet® as the image generator. The 4D video is generated at 512×512 resolution using a Karras® scheduler with 50 denoising steps.

Embodiments discussed herein introduce a generative rendering technique with a zero-shot pipeline based on 2D diffusion models for 4D conditioned animation generation. Systems and techniques discussed herein animate creator-defined low-fidelity meshes and motion sequences, bypassing steps requiring significant manual labor such as detailing, texturing, physical simulation, etc. Embodiments discussed herein utilize generative rendering with a prior within a depth-conditioned 2D diffusion model to provide the basic structure and physical fidelity to make convincing animations. This is accomplished by injecting the correspondences into the diffusion model using a combination of pre-attention and post-attention feature injection while unifying these features in the UV space. Techniques discussed herein demonstrate better frame consistency and prompt fidelity than relevant baselines.

In embodiments, FIG. 7 illustrates an example of a routine 700 performed in accordance with systems and techniques discussed herein. For example, routine 700 can be performed by system 600 its systems. However, embodiments are not limited in this manner.

In block 702, the routine 700 receives a prompt and an input mesh to generate a four-dimensional (4D) video. The prompt may be a text prompt, or an image prompt used by the diffusional model to guide the generation of the 4D video. For example, a prompt is the initial input or starting point that is provided to guide the generation or regeneration process. It can be a textual description, an image, or any other form of input used to specify certain characteristics or constraints for the output. The prompt helps to shape the generation process by providing high-level instructions or constraints for the diffusion model to follow.

Similarly, the input mesh is also used by the diffusion model to guide the output. In this case, it used to generate guide rails to enable the diffusion model to generate a 4D video. Generally, input mesh is a representation of a three-dimensional object or scene in the form of a mesh structure. The input mesh typically consists of vertices, edges, and faces, which define the shape and geometry of the object and scene. The input mesh is used as an input to the diffusion model, providing information about the structure and appearance of the object or scene being generated or regenerated. The diffusion model can then utilize this input mesh to extract features, analyze the spatial relationships between different parts of the object or scene, and generate high-quality outputs based on the given input.

In block 704, the routine 700 includes determining a depth map and a UV coordinate map from the input mesh. Specifically, a renderer processes the input mesh to generate the depth map(s) and the UV coordinate map(s). As previously discussed, the depth map includes depth data represents the relative depth or distance of each pixel in the image from the camera's viewpoint. Similarly and as previously discussed, a UV coordinate map is a two-dimensional representation or parameterization of a three-dimensional surface or mesh. It associates each vertex of the surface with a set of 2D coordinates called UV coordinates. These maps are provided to a diffusion model to generate a number of keyframes.

In block 706, routine 700 includes determining a plurality of keyframes from the depth map and the UV map. For example, the diffusion model generates the keyframes from the depth map and UV map by performing the diffusion process and the denoising process, as described above in FIG. 2. The keyframes are individual frames that define significant moments or important visual states. In this context, the keyframes include variations of the input mesh. The diffusion model utilizes the keyframes to fill or generate the in-between frames of the 4D video using the techniques discussed herein, e.g., feature injection and noise initiation, to create smooth and continuous animations.

In block 708, routine 700 determines pre-attention features and post-attention features from at least a subset of the plurality of keyframes. Specifically, a diffusion model with extended attention extracts their pre- and post-attention features for the set of keyframes. In addition, and at block 710, the routine 700 performs UV-guided noise initialization for each object in the input mesh. The diffusion model initializes the noise in the UV space of each object, which it then renders into each image.

In block 712, routine 700 generates frames for a four-dimensional (4D) video based on the prompt, the UV-guided noise initialization, and injecting the pre-attention features and the post-attention features into the diffusion model during a regeneration process performed on noise images.

FIG. 8 illustrates another example routine 800 that may be performed by systems discussed herein. For example, routine 800 may be performed by a content generation system 616 including diffusion model 624. However, embodiments are not limited in this manner.

In block 802, routine 800 receives a prompt and an input mesh to generate a four-dimensional (4D) video. The prompt and the input mesh provide the diffusion model guide rails or control rails to aid in the frame generation during the regeneration process to create the 4D video.

In block 804, routine 800 generates keyframes from a depth map and a UV coordinate map, wherein the depth map and the UV coordinate map are generated from the input mesh. As described above, the keyframes can be generated by a diffusion model configured with ControlNet® or another neural network configured to control a diffusion model processing one or more depth maps and UV coordinate maps generated from the input mesh.

In block 806, routine 800 extracts features from the keyframes processed through a diffusion model. The diffusion model further processes the set of keyframes with extended attention to extract or determine pre-attention features and post-attention features.

In block 808, routine 800 generates frames of the 4D video based on the prompt, UV-guided noise initialization of each object, and injecting the features extracted from each of the keyframes into the diffusion model and the prompt during a regeneration process.

Figure 9:
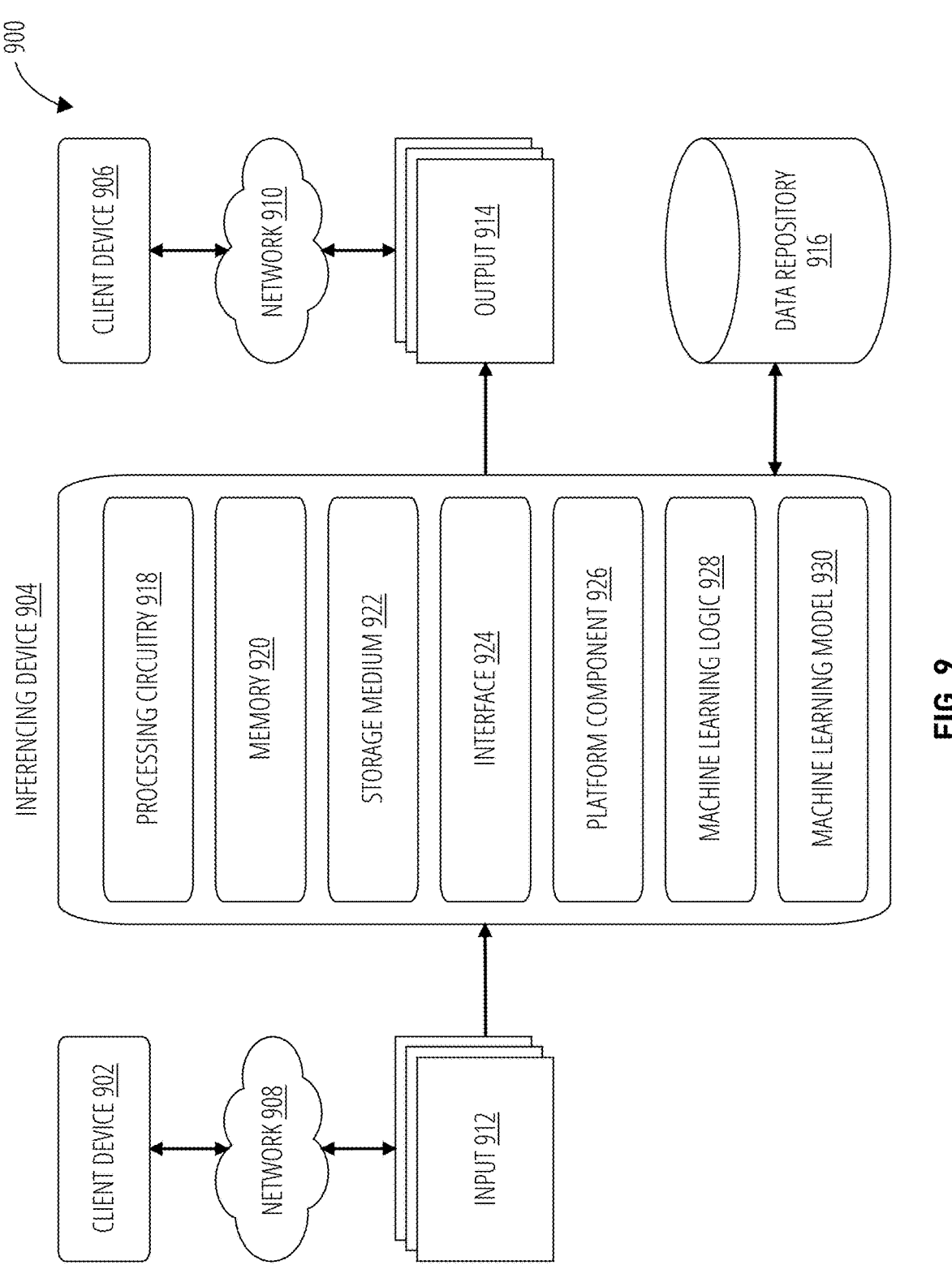
FIG. 9 illustrates a system 900 in accordance with one embodiment.

FIG. 9 illustrates an embodiment of a system 900. The system 900 is suitable for implementing one or more embodiments as described herein. In one embodiment, for example, the system 900 and one or more components thereof is an AI/ML system suitable for performing one or more operations discussed herein, such as rendering depth maps and UV coordinate maps from an input mesh, generate keyframes from an input mesh, and/or generate a 4D video from the input mesh.

The system 900 comprises a set of M devices, where M is any positive integer. FIG. 9 depicts three devices (M=3), including a client device 902, an inferencing device 904, and a client device 906. The inferencing device 904 communicates information with the client device 902 and the client device 906 over a network 908 and a network 910, respectively. The information may include input 912 from the client device 902 and output 914 to the client device 906, or vice-versa. In one alternative, the input 912 and the output 914 are communicated between the same client device 902 or client device 906. In another alternative, the input 912 and the output 914 are stored in a data repository 916. In yet another alternative, the input 912 and the output 914 are communicated via a platform component 926 of the inferencing device 904, such as an input/output (I/O) device (e.g., a touchscreen, a microphone, a speaker, etc.).

Figure 14:
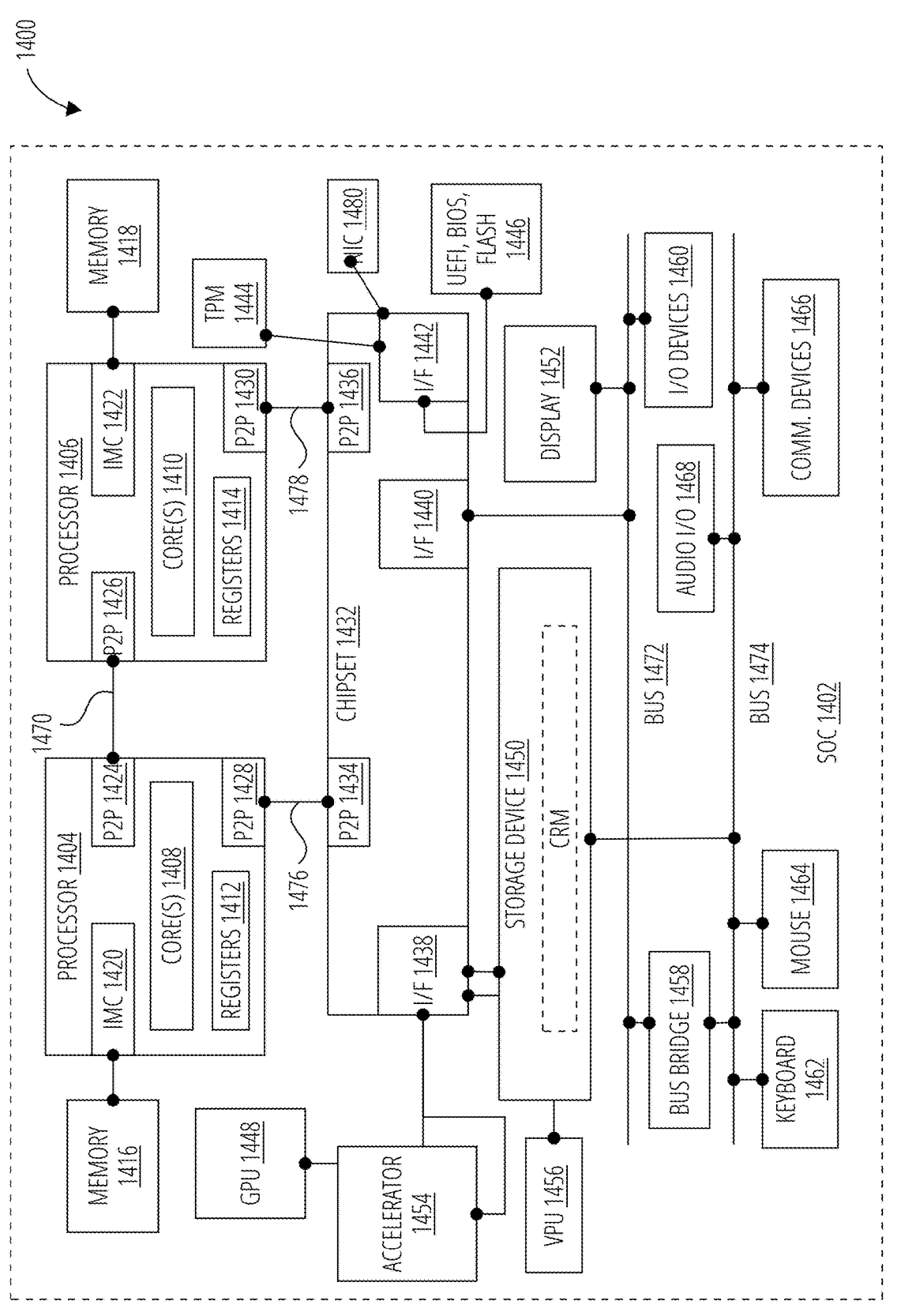
FIG. 14 illustrates a computing architecture 1400 in accordance with one embodiment.

As depicted in FIG. 9, the inferencing device 904 includes processing circuitry 918, a memory 920, a storage medium 922, an interface 924, a platform component 926, ML logic 928, and an ML model 930. In some implementations, the inferencing device 904 includes other components or devices as well. Examples for software elements and hardware elements of the inferencing device 904 are described in more detail with reference to a computing architecture 1400 as depicted in FIG. 14. Embodiments are not limited to these examples.

Figure 15:
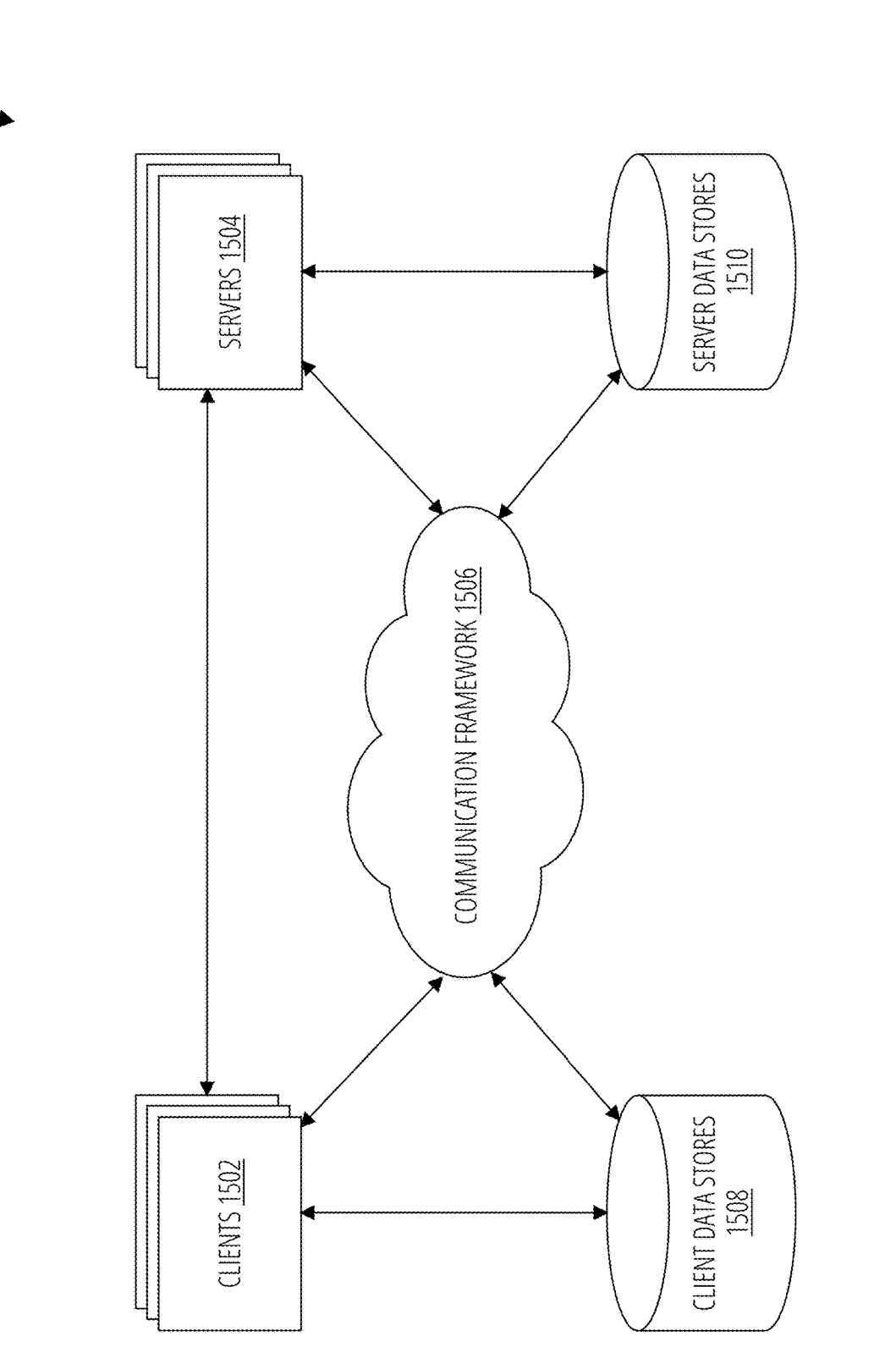
FIG. 15 illustrates a communications architecture 1500 in accordance with one embodiment.

The inferencing device 904 is generally arranged to receive an input 912, process the input 912 via one or more AI/ML techniques, and send an output 914. The inferencing device 904 receives the input 912 from the client device 902 via the network 908, the client device 906 via the network 910, the platform component 926 (e.g., a touchscreen as a text command or microphone as a voice command), the memory 920, the storage medium 922 or the data repository 916. The inferencing device 904 sends the output 914 to the client device 902 via the network 908, the client device 906 via the network 910, the platform component 926 (e.g., a touchscreen to present text, graphic or video information or speaker to reproduce audio information), the memory 920, the storage medium 922 or the data repository 916. Examples for the software elements and hardware elements of the network 908 and the network 910 are described in more detail with reference to a communications architecture 1500 as depicted in FIG. 15. Embodiments are not limited to these examples.

The inferencing device 904 includes ML logic 928 and an ML model 930 to implement various AI/ML techniques for various AI/ML tasks. The ML logic 928 receives the input 912 and processes the input 912 using the ML model 930. The ML model 930 performs inferencing operations to generate an inference for a specific task from the input 912. In some cases, the inference is part of the output 914. The output 914 is used by the client device 902, the inferencing device 904, or the client device 906 to perform subsequent actions in response to the output 914.

In various embodiments, the ML model 930 is a trained ML model 930 using a set of training operations. An example of training operations to train the ML model 930 is described with reference to FIG. 10.

Figure 10:
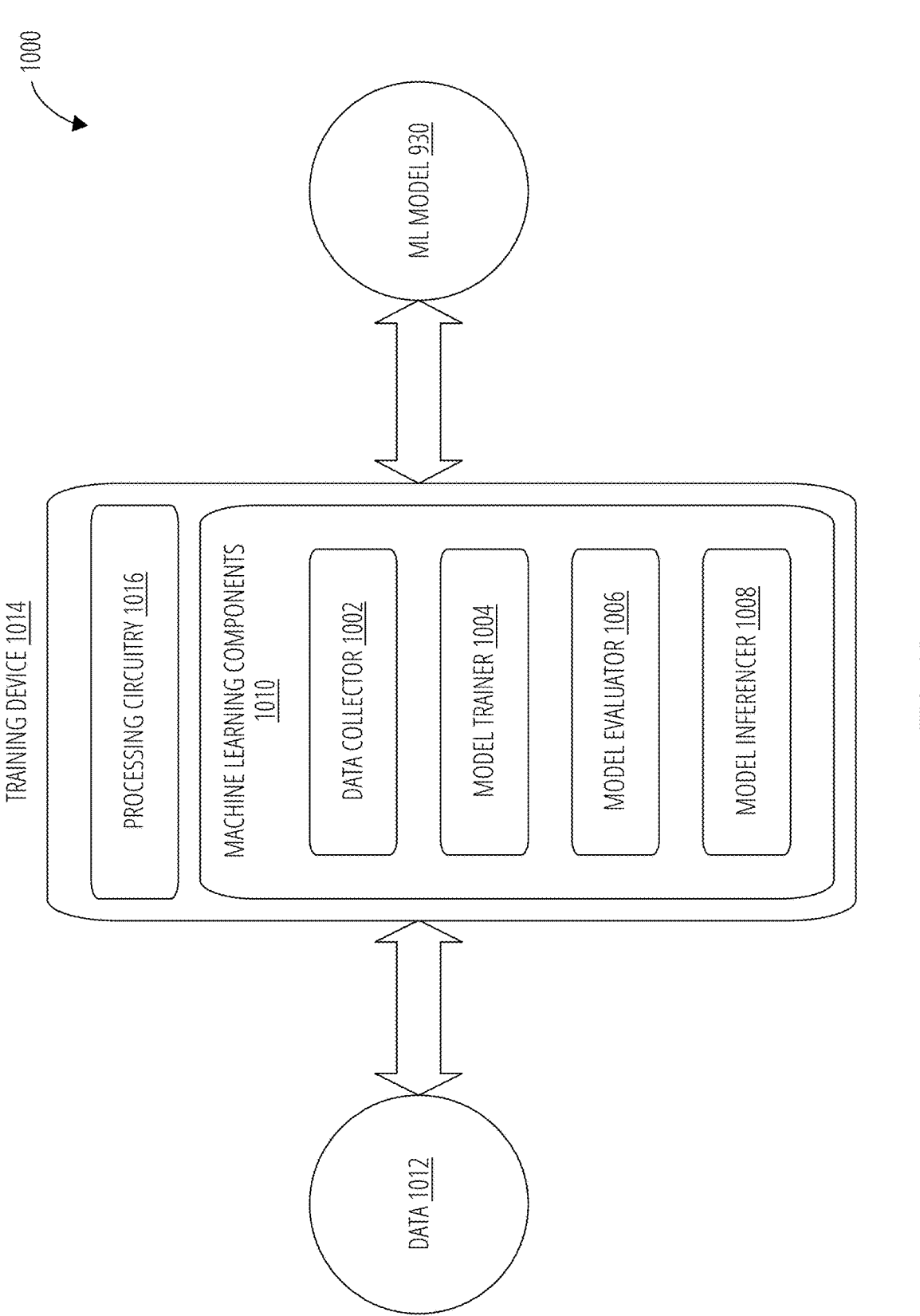
FIG. 10 illustrates an apparatus 1000 in accordance with one embodiment.

FIG. 10 illustrates an apparatus 1000. The apparatus 1000 depicts a training device 1014 suitable to generate a trained ML model 930 for the inferencing device 904 of the system 900. As depicted in FIG. 10, the training device 1014 includes a processing circuitry 1016 and a set of ML components 1010 to support various AI/ML techniques, such as a data collector 1002, a model trainer 1004, a model evaluator 1006 and a model inferencer 1008.

In general, the data collector 1002 collects data 1012 from one or more data sources to use as training data for the ML model 930. The data collector 1002 collects different types of data 1012, such as text information, audio information, image information, video information, graphic information, and so forth. The model trainer 1004 receives as input the collected data and uses a portion of the collected data as test data for an AI/ML algorithm to train the ML model 930. The model evaluator 1006 evaluates and improves the trained ML model 930 using a portion of the collected data as test data to test the ML model 930. The model evaluator 1006 also uses feedback information from the deployed ML model 930. The model inferencer 1008 implements the trained ML model 930 to receive as input new unseen data, generate one or more inferences on the new data, and output a result such as an alert, a recommendation or other post-solution activity.

An exemplary AI/ML architecture for the ML components 1010 is described in more detail with reference to FIG. 11.

Figure 11:
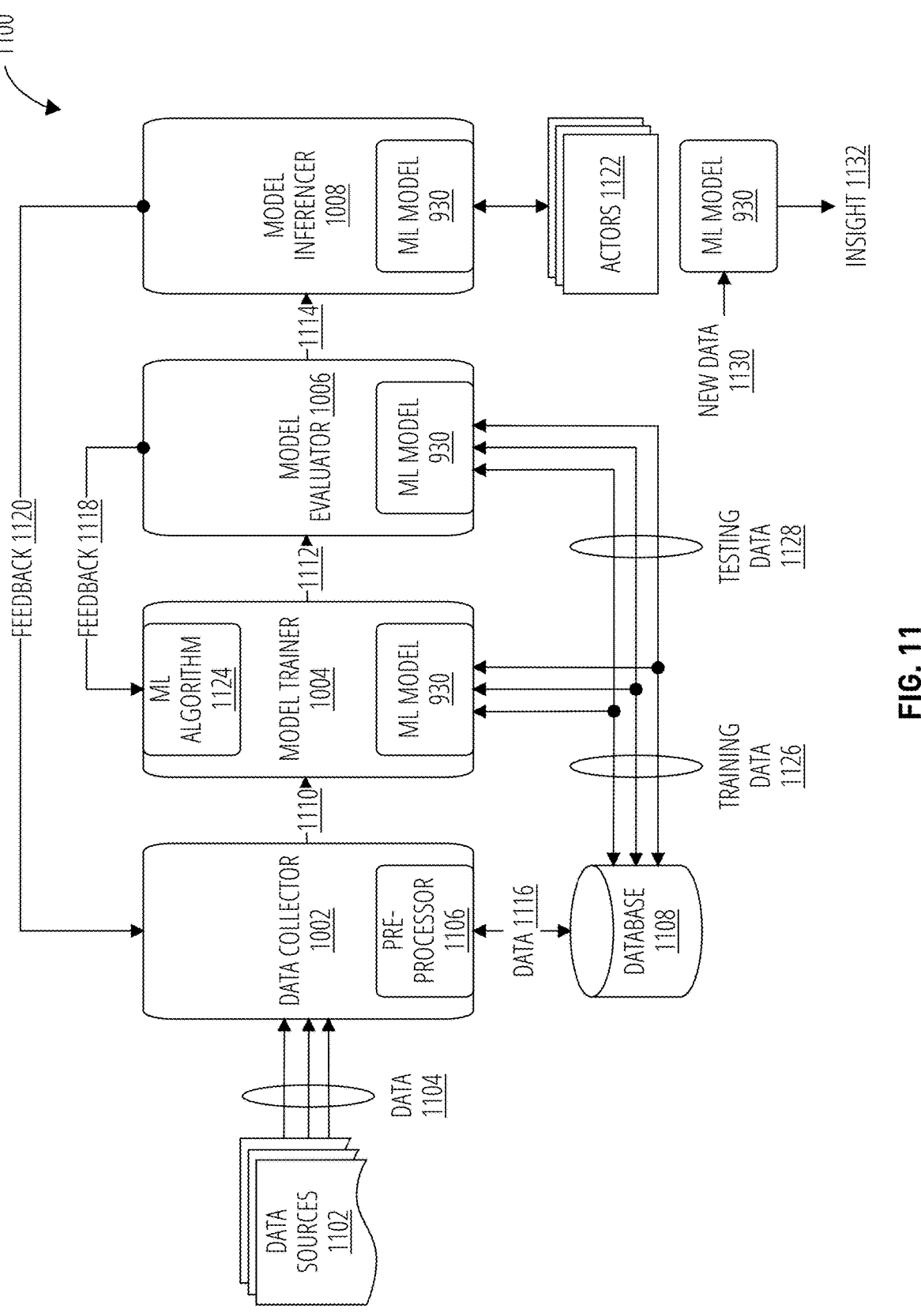
FIG. 11 illustrates an artificial intelligence architecture 1100 in accordance with one embodiment.

FIG. 11 illustrates an artificial intelligence architecture 1100 suitable for use by the training device 1014 to generate the ML model 930 for deployment by the inferencing device 904. The artificial intelligence architecture 1100 is an example of a system suitable for implementing various AI techniques and/or ML techniques to perform various inferencing tasks on behalf of the various devices of the system 900.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 1100 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 930, evaluate performance of the trained ML model 930, and deploy the tested ML model 930 as the trained ML model 930 in a production environment, and continuously monitor and maintain it.

The ML model 930 is a mathematical construct used to predict outcomes based on a set of input data. The ML model 930 is trained using large volumes of training data 1126, and it can recognize patterns and trends in the training data 1126 to make accurate predictions. The ML model 930 is derived from an ML algorithm 1124 (e.g., a neural network, decision tree, support vector machine, etc.). A data set is fed into the ML algorithm 1124 which trains an ML model 930 to "learn" a function that produces mappings between a set of inputs and a set of outputs with a reasonably high accuracy. Given a sufficiently large enough set of inputs and outputs, the ML algorithm 1124 finds the function for a given task. This function may even be able to produce the correct output for input that it has not seen during training. A data scientist prepares the mappings, selects and tunes the ML algorithm 1124, and evaluates the resulting model performance. Once the ML logic 928 is sufficiently accurate on test data, it can be deployed for production use.

The ML algorithm 1124 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 1124 of the artificial intelligence architecture 1100 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests are a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks are a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 11, the artificial intelligence architecture 1100 includes a set of data sources 1102 to source data 1104 for the artificial intelligence architecture 1100. Data sources 1102 may comprise any device capable generating, processing, storing or managing data 1104 suitable for a ML system. Examples of data sources 1102 include without limitation databases, web scraping, sensors and Internet of Things (IoT) devices, image and video cameras, audio devices, text generators, publicly available databases, private databases, and many other data sources 1102. The data sources 1102 may be remote from the artificial intelligence architecture 1100 and accessed via a network, local to the artificial intelligence architecture 1100 an accessed via a network interface or may be a combination of local and remote data sources 1102.

The data sources 1102 source difference types of data 1104. By way of example and not limitation, the data 1104 includes structured data from relational databases, such as customer profiles, transaction histories, or product inventories. The data 1104 includes unstructured data from websites such as customer reviews, news articles, social media posts, or product specifications. The data 1104 includes data from temperature sensors, motion detectors, and smart home appliances. The data 1104 includes image data from medical images, security footage, or satellite images. The data 1104 includes audio data from speech recognition, music recognition, or call centers. The data 1104 includes text data from emails, chat logs, customer feedback, news articles or social media posts. The data 1104 includes publicly available datasets such as those from government agencies, academic institutions, or research organizations. These are just a few examples of the many sources of data that can be used for ML systems. It is important to note that the quality and quantity of the data is critical for the success of a machine learning project.

The data 1104 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 1102 are communicatively coupled to a data collector 1002. The data collector 1002 gathers relevant data 1104 from the data sources 1102. Once collected, the data collector 1002 may use a pre-processor 1106 to make the data 1104 suitable for analysis. This involves data cleaning, transformation, and feature engineering. Data preprocessing is a step in ML as it directly impacts the accuracy and effectiveness of the ML model 930. The pre-processor 1106 receives the data 1104 as input, processes the data 1104, and outputs pre-processed data 1116 for storage in a database 1108. Examples for the database 1108 includes a hard drive, solid state storage, and/or random access memory (RAM).

The data collector 1002 is communicatively coupled to a model trainer 1004. The model trainer 1004 performs AI/ML model training, validation, and testing which may generate model performance metrics as part of the model testing procedure. The model trainer 1004 receives the pre-processed data 1116 as input 1110 or via the database 1108. The model trainer 1004 implements a suitable ML algorithm 1124 to train an ML model 930 on a set of training data 1126 from the pre-processed data 1116. The training process involves feeding the pre-processed data 1116 into the ML algorithm 1124 to produce or optimize an ML model 930. The training process adjusts its parameters until it achieves an initial level of satisfactory performance.

The model trainer 1004 is communicatively coupled to a model evaluator 1006. After an ML model 930 is trained, the ML model 930 needs to be evaluated to assess its performance. This is done using various metrics such as accuracy, precision, recall, and F1 score. The model trainer 1004 outputs the ML model 930, which is received as input 1110 or from the database 1108. The model evaluator 1006 receives the ML model 930 as input 1112, and it initiates an evaluation process to measure performance of the ML model 930. The evaluation process includes providing feedback 1118 to the model trainer 1004. The model trainer 1004 re-trains the ML model 930 to improve performance in an iterative manner.

The model evaluator 1006 is communicatively coupled to a model inferencer 1008. The model inferencer 1008 provides AI/ML model inference output (e.g., inferences, predictions or decisions). Once the ML model 930 is trained and evaluated, it is deployed in a production environment where it is used to make predictions on new data. The model inferencer 1008 receives the evaluated ML model 930 as input 1114. The model inferencer 1008 uses the evaluated ML model 930 to produce insights or predictions on real data, which is deployed as a final production ML model 930. The inference output of the ML model 930 is use case specific. The model inferencer 1008 also performs model monitoring and maintenance, which involves continuously monitoring performance of the ML model 930 in the production environment and making any updates or modifications to maintain its accuracy and effectiveness. The model inferencer 1008 provides feedback 1118 to the data collector 1002 to train or re-train the ML model 930. The feedback 1118 includes model performance feedback information, which is used for monitoring and improving performance of the ML model 930.

Some or all of the model inferencer 1008 is implemented by various actors 1122 in the artificial intelligence architecture 1100, including the ML model 930 of the inferencing device 904, for example. The actors 1122 use the deployed ML model 930 on new data to make inferences or predictions for a given task and output an insight 1132. The actors 1122 implement the model inferencer 1008 locally, or remotely receives outputs from the model inferencer 1008 in a distributed computing manner. The actors 1122 trigger actions directed to other entities or to itself. The actors 1122 provide feedback 1120 to the data collector 1002 via the model inferencer 1008. The feedback 1120 comprise data needed to derive training data, inference data or to monitor the performance of the ML model 930 and its impact to the network through updating of key performance indicators (KPIs) and performance counters.

As previously described with reference to FIGS. 1, 2, the systems 900, 1000 implement some or all of the artificial intelligence architecture 1100 to support various use cases and solutions for various AI/ML tasks. In various embodiments, the training device 1014 of the apparatus 1000 uses the artificial intelligence architecture 1100 to generate and train the ML model 930 for use by the inferencing device 904 for the system 900. In one embodiment, for example, the training device 1014 may train the ML model 930 as a neural network, as described in more detail with reference to FIG. 12. Other use cases and solutions for AI/ML are possible as well, and embodiments are not limited in this context.

Figure 12:
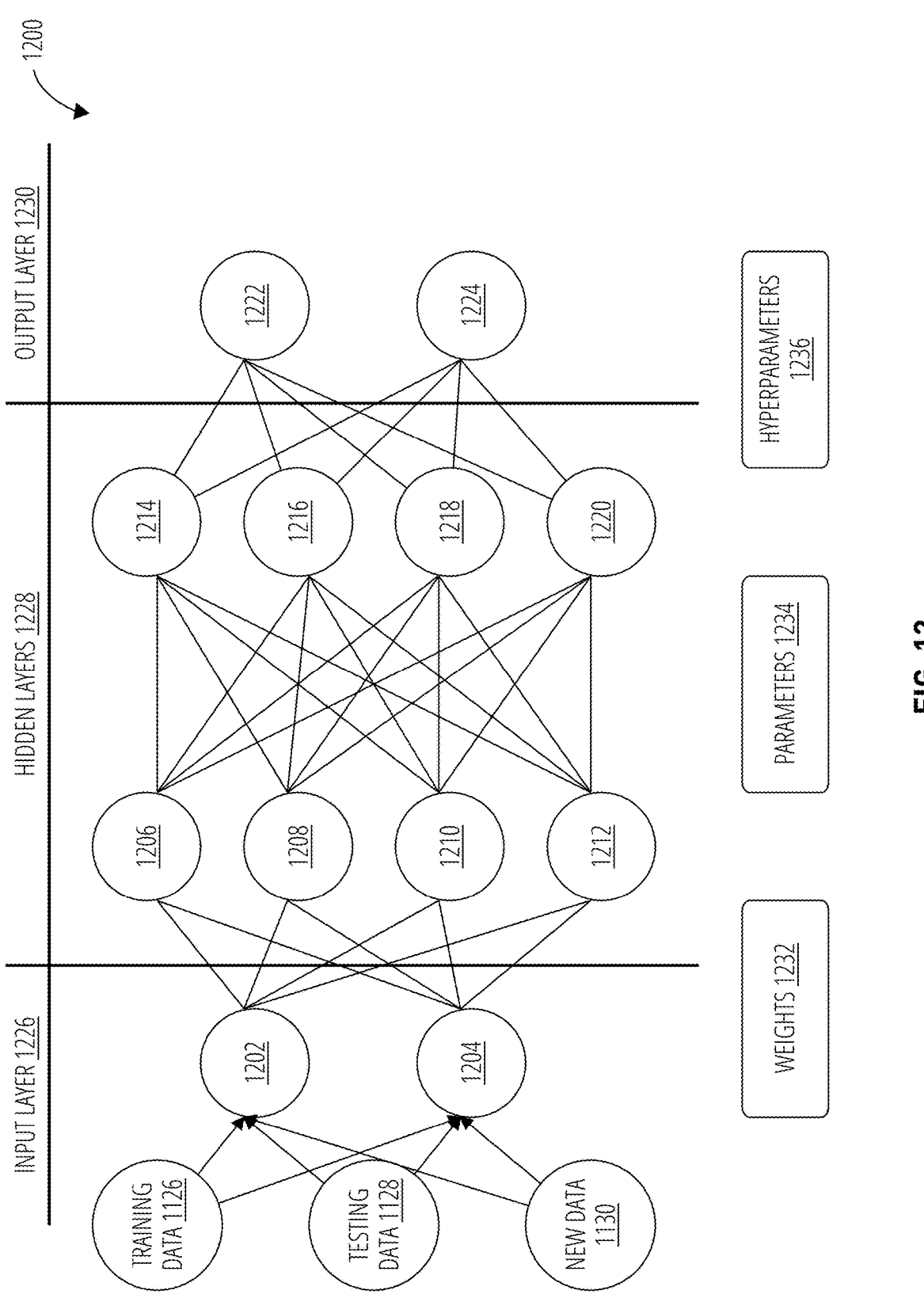
FIG. 12 illustrates an artificial neural network 1200 in accordance with one embodiment.

FIG. 12 illustrates an embodiment of an artificial neural network 1200. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 1200 comprises multiple node layers, containing an input layer 1226, one or more hidden layers 1228, and an output layer 1230. Each layer comprises one or more nodes, such as nodes 1202 to 1224. As depicted in FIG. 12, for example, the input layer 1226 has nodes 1202, 1204. The artificial neural network 1200 has two hidden layers 1228, with a first hidden layer having nodes 1206, 1208, 1210 and 1212, and a second hidden layer having nodes 1214, 1216, 1218 and 1220. The artificial neural network 1200 has an output layer 1230 with nodes 1222, 1224. Each node 1202 to 1224 comprises a processing element (PE), or artificial neuron, which connects to another and has an associated weight and threshold. If the output of any individual node is above the specified threshold value, that node is activated, sending data to the next layer of the network. Otherwise, no data is passed along to the next layer of the network.

In general, artificial neural network 1200 relies on training data 1126 to learn and improve accuracy over time. However, once the artificial neural network 1200 is fine-tuned for accuracy, and tested on testing data 1128, the artificial neural network 1200 is ready to classify and cluster new data 1130 at a high velocity. Tasks in speech recognition or image recognition can take minutes versus hours when compared to the manual identification by human experts.

Each individual node 1202 to 424 is a linear regression model, composed of input data, weights, a bias (or threshold), and an output. The linear regression model may have a formula similar to Equation (1), as follows:

$$\sum w_i x_i + \text{bias} = w1x1 + w2x2 + w3x3 + \text{bias} \qquad \text{EQUATION (1)}$$

$$\text{output} = f(x) = 1 \text{ if } \sum w1x1 + b >= 0;\, 0 \text{ if } \sum w1x1 + b < 0$$

Once an input layer 1226 is determined, a set of weights 1232 are assigned. The weights 1232 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 1200 as a feedforward network.

In one embodiment, the artificial neural network 1200 leverages sigmoid neurons, which are distinguished by having values between 0 and 1. Since the artificial neural network 1200 behaves similarly to a decision tree, cascading data from one node to another, having x values between 0 and 1 will reduce the impact of any given change of a single variable on the output of any given node, and subsequently, the output of the artificial neural network 1200.

The artificial neural network 1200 has many practical use cases, like image recognition, speech recognition, text recognition or classification. The artificial neural network 1200 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 1234 of the model adjust to gradually converge at the minimum.

In one embodiment, the artificial neural network 1200 is feedforward, meaning it flows in one direction, from input to output. In one embodiment, the artificial neural network 1200 uses backpropagation. Backpropagation is when the artificial neural network 1200 moves in the opposite direction from output to input. Backpropagation allows calculation and attribution of errors associated with each neuron 1202 to 1224, thereby allowing adjustment to fit the parameters 1234 of the ML model 930 appropriately.

The artificial neural network 1200 is implemented as different neural networks depending on a given task. Neural networks are classified into different types, which are used for different purposes. In one embodiment, the artificial neural network 1200 is implemented as a feedforward neural network, or multi-layer perceptrons (MLPs), comprised of an input layer 1226, hidden layers 1228, and an output layer 1230. While these neural networks are also commonly referred to as MLPs, they are actually comprised of sigmoid neurons, not perceptrons, as most real-world problems are nonlinear. Trained data 1104 usually is fed into these models to train them, and they are the foundation for computer vision, natural language processing, and other neural networks. In one embodiment, the artificial neural network 1200 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1200 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1200 is implemented as any type of neural network suitable for a given operational task of system 900, and the MLP, CNN, and RNN are merely a few examples. Embodiments are not limited in this context.

The artificial neural network 1200 includes a set of associated parameters 1234. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1200 is implemented as a deep learning neural network. The term deep learning neural network refers to a depth of layers in a given neural network. A neural network that has more than three layers—which would be inclusive of the inputs and the output—can be considered a deep learning algorithm. A neural network that has two or three layers, however, may be referred to as a basic neural network. A deep learning neural network may tune and optimize one or more hyperparameters 1236. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 13:
FIG. 13 illustrates a computer-readable storage medium 1302 in accordance with one embodiment.

FIG. 13 illustrates an apparatus 1300. Apparatus 1300 comprises any non-transitory computer-readable storage medium 1302 or machine-readable storage medium, such as an optical, magnetic or semiconductor storage medium. In various embodiments, apparatus 1300 comprises an article of manufacture or a product. In some embodiments, the computer-readable storage medium 1302 stores computer executable instructions with which one or more processing devices or processing circuitry can execute. For example, computer executable instructions 1304 includes instructions to implement operations described with respect to any logic flows described herein. Examples of computer-readable storage medium 1302 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1304 include any suitable type of code, such as source code, compiled code, interpreted code, executable code, static code, dynamic code, object-oriented code, visual code, and the like.

FIG. 14 illustrates an embodiment of a computing architecture 1400. Computing architecture 1400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1400 has a single processor with one core or more than one processor. Note that the term "processor" refers to a processor with a single core or a processor package with multiple processor cores. In at least one embodiment, the computing architecture 1400 is representative of the components of the system 900. More generally, the computing architecture 1400 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1400. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 14, computing architecture 1400 comprises a system-on-chip (SoC) 1402 for mounting platform components. System-on-chip (SoC) 1402 is a point-to-point (P2P) interconnect platform that includes a first processor 1404 and a second processor 1406 coupled via a point-to-point interconnect 1470 such as an Ultra Path Interconnect (UPI). In other embodiments, the computing architecture 1400 is another bus architecture, such as a multi-drop bus. Furthermore, each of processor 1404 and processor 1406 are processor packages with multiple processor cores including core(s) 1408 and core(s) 1410, respectively. While the computing architecture 1400 is an example of a two-socket (2S) platform, other embodiments include more than two sockets or one socket. For example, some embodiments include a four-socket (4S) platform or an eight-socket (8S)

platform. Each socket is a mount for a processor and may have a socket identifier. Note that the term platform refers to a motherboard with certain components mounted such as the processor 1404 and chipset 1432. Some platforms include additional components, and some platforms include sockets to mount the processors and/or the chipset. Furthermore, some platforms do not have sockets (e.g., SoC, or the like). Although depicted as an SoC 1402, one or more of the components of the SoC 1402 are included in a single die package, a multi-chip module (MCM), a multi-die package, a chipset, a bridge, and/or an interposer. Therefore, embodiments are not limited to a SoC.

The processor 1404 and processor 1406 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1404 and/or processor 1406. Additionally, the processor 1404 need not be identical to processor 1406.

Processor 1404 includes an integrated memory controller (IMC) 1420 and point-to-point (P2P) interface 1424 and P2P interface 1428. Similarly, the processor 1406 includes an IMC 1422 as well as P2P interface 1426 and P2P interface 1430. IMC 1420 and IMC 1422 couple the processor 1404 and processor 1406, respectively, to respective memories (e.g., memory 1416 and memory 1418). Memory 1416 and memory 1418 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1416 and the memory 1418 locally attach to the respective processors (i.e., processor 1404 and processor 1406). In other embodiments, the main memory couple with the processors via a bus and shared memory hub. Processor 1404 includes registers 1412 and processor 1406 includes registers 1414.

Computing architecture 1400 includes chipset 1432 coupled to processor 1404 and processor 1406. Furthermore, chipset 1432 are coupled to storage device 1450, for example, via an interface (I/F) 1438. The I/F 1438 may be, for example, a Peripheral Component Interconnect-enhanced (PCIe) interface, a Compute Express Link® (CXL) interface, or a Universal Chipset Interconnect Express (UCIe) interface. Storage device 1450 stores instructions executable by circuitry of computing architecture 1400 (e.g., processor 1404, processor 1406, GPU 1448, accelerator 1454, vision processing unit 1456, or the like). For example, storage device 1450 can store instructions for the client device 902, the client device 906, the inferencing device 904, the training device 1014, or the like.

Processor 1404 couples to the chipset 1432 via P2P interface 1428 and P2P 1434 while processor 1406 couples to the chipset 1432 via P2P interface 1430 and P2P 1436. Direct media interface (DMI) 1476 and DMI 1478 couple the P2P interface 1428 and the P2P 1434 and the P2P interface 1430 and P2P 1436, respectively. DMI 1476 and DMI 1478 is a high-speed interconnect that facilitates, e.g., eight Giga Transfers per second (GT/s) such as DMI 3.0. In other embodiments, the processor 1404 and processor 1406 interconnect via a bus.

The chipset 1432 comprises a controller hub such as a platform controller hub (PCH). The chipset 1432 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1432 comprises more than one controller hub such as a chipset with a memory controller hub, a graphics controller hub, and an input/output (I/O) controller hub.

In the depicted example, chipset 1432 couples with a trusted platform module (TPM) 1444 and UEFI, BIOS, FLASH circuitry 1446 via I/F 1442. The TPM 1444 is a dedicated microcontroller designed to secure hardware by integrating cryptographic keys into devices. The UEFI, BIOS, FLASH circuitry 1446 may provide pre-boot code. The I/F 1442 may also be coupled to a network interface circuit (NIC) 1480 for connections off-chip.

Furthermore, chipset 1432 includes the I/F 1438 to couple chipset 1432 with a high-performance graphics engine, such as, graphics processing circuitry or a graphics processing unit (GPU) 1448. In other embodiments, the computing architecture 1400 includes a flexible display interface (FDI) (not shown) between the processor 1404 and/or the processor 1406 and the chipset 1432. The FDI interconnects a graphics processor core in one or more of processor 1404 and/or processor 1406 with the chipset 1432.

The computing architecture 1400 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1454 and/or vision processing unit 1456 are coupled to chipset 1432 via I/F 1438. The accelerator 1454 is representative of any type of accelerator device (e.g., a data streaming accelerator, cryptographic accelerator, cryptographic co-processor, an offload engine, etc.). One example of an accelerator 1454 is the Intel® Data Streaming Accelerator (DSA). The accelerator 1454 is a device including circuitry to accelerate copy operations, data encryption, hash value computation, data comparison operations (including comparison of data in memory 1416 and/or memory 1418), and/or data compression. Examples for the accelerator 1454 include a USB device, PCI device, PCIe device, CXL device, UCIe device, and/or an SPI device. The accelerator 1454 also includes circuitry arranged to execute machine learning (ML) related operations (e.g., training, inference, etc.) for ML models. Generally, the accelerator 1454 is specially designed to perform computationally intensive operations, such as hash value computations, comparison operations, cryptographic operations, and/or compression operations, in a manner that is more efficient than when performed by the processor 1404 or processor 1406. Because the load of the computing architecture 1400 includes hash value computations, comparison operations, cryptographic operations, and/or compression operations, the accelerator 1454 greatly increases performance of the computing architecture 1400 for these operations.

The accelerator 1454 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1454. For example, the accelerator 1454 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1454 via a non-posted write (e.g., a deferred memory write (DMWr)). One example of an instruction that atomically submits a work descriptor to the shared work queue of the accelerator 1454 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1454. The dedicated work queue may accept job submissions via commands such as the movdir64b instruction.

Various I/O devices 1460 and display 1452 couple to the bus 1472, along with a bus bridge 1458 which couples the bus 1472 to a second bus 1474 and an I/F 1440 that connects the bus 1472 with the chipset 1432. In one embodiment, the second bus 1474 is a low pin count (LPC) bus. Various input/output (I/O) devices couple to the second bus 1474 including, for example, a keyboard 1462, a mouse 1464 and communication devices 1466.

Furthermore, an audio I/O 1468 couples to second bus 1474. Many of the I/O devices 1460 and communication devices 1466 reside on the system-on-chip (SoC) 1402 while the keyboard 1462 and the mouse 1464 are add-on peripherals. In other embodiments, some or all the I/O devices 1460 and communication devices 1466 are add-on peripherals and do not reside on the system-on-chip (SoC) 1402.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 includes one or more clients 1502 and servers 1504. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 communicate information between each other using a communication framework 1506. The communication framework 1506 implements any well-known communications techniques and protocols. The communication framework 1506 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1506 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/900/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1502 and the servers 1504. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application, or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose, or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines is apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A computer-implemented method, comprising:
receiving a prompt and an input mesh to generate a four-dimensional (4D) video;
generating, using a diffusion model, keyframes from a depth map and a UV coordinate map based on the input mesh;
extracting, using the diffusion model, features from the keyframes; and
generating frames of the 4D video based on the prompt, UV-guided noise initialization of each object, and injecting the features extracted from each of the keyframes into the diffusion model during a regeneration process.

2. The computer-implemented method of claim 1, wherein extracting the features comprises:
performing a plurality of diffusion steps; and
performing extended attention on a subset of the keyframes to extract the features during each of the plurality of diffusion steps.

3. The computer-implemented method of claim 2, wherein the features extracted comprise pre-attention features, the pre-attention features comprise a key, a query, and a value, and the method comprises:
concatenating the pre-attention features of the subset of the keyframes with the pre-attention features of a current frame; and
injecting a result of the concatenating into the diffusion model for the current frame.

4. The computer-implemented method of claim 2, wherein the features extracted comprise post-attention features, and the post-attention features comprising outputs from a previous attention feature module, and wherein injecting the features includes reprojecting the outputs from the previous attention feature module to a current frame.

5. The computer-implemented method of claim 2, wherein the features comprise pre-attention features and post-attention features and the method comprises generating a UV-space feature map by blending the pre-attention features and the post-attention features into correspondence.

6. The computer-implemented method of claim 5, wherein blending the pre-attention features and the post-attention features comprises:
blending, for each of the frames, the pre-attention features and the post-attention features from the frames sequentially and filling a texel with features of its corresponding pixel in a particular frame if the corresponding pixel has not been filled before, and
determining, for each of the frames, a unified texture by taking a mean of inpainted texture and an average texture.

7. The computer-implemented method of claim 1, comprising generating the depth map and the UV coordinate map with a renderer processing the input mesh.

8. The computer-implemented method of claim 1, wherein the input mesh is a scene-level proxy mesh, and the prompt is a text prompt.

9. The computer-implemented method of claim 1, comprising performing UV-guided noise initialization for each object in the input mesh by:
generating a Gaussian noise texture for each object in the input mesh, and
projecting the noise textures to each of the frames utilizing a frame-UV correspondence to the regeneration process.

10. A non-transitory computer-readable storage medium, the computer-readable storage medium including instructions that when executed by a processor, cause the processor to perform the operations comprising:
determining, using a renderer, a depth map and a UV coordinate map from an input mesh;
determining, using a diffusion model, a plurality of keyframes from the depth map and the UV map;
identifying, using the diffusion model, pre-attention features and post-attention features;
performing UV-guided noise initialization for each object in the input mesh; and
generating frames for a 4D video based on a prompt, the UV-guided noise initialization, and injecting the pre-attention features and the post-attention features into the diffusion model during a regeneration process performed on noise images.

11. The computer-readable storage medium of claim 10, wherein identifying the pre-attention features and the post-attention features comprises the processor performing, for each of a plurality of diffusion steps, extended attention on at least a subset of keyframes to extract the pre-attention features and the post-attention features.

12. The computer-readable storage medium of claim 10, wherein the pre-attention features comprise a key, a query, and a value, and the processor to perform:
   concatenating the pre-attention features of the subset of the keyframes with the pre-attention features of a current frame; and
   injecting a result of the concatenating into the diffusion model during the regeneration process for the current frame.

13. The computer-readable storage medium of claim 10, wherein the post-attention features comprise outputs from a previous attention feature module, and the processor injecting the post-attention features by reprojecting the outputs from the previous attention feature module to a current frame.

14. The computer-readable storage medium of claim 10, comprises the processor performing the operations comprising:
   obtaining the prompt and the input mesh to generate the four-dimensional (4D) video; and
   generating a UV-space feature map by blending the pre-attention features and the post-attention features into correspondence.

15. The computer-readable storage medium of claim 14, wherein blending the pre-attention features and the post-attention features comprises:
   blending, for each of the frames, the pre-attention features and the post-attention features from the frames sequentially and filling a texel with features of its corresponding pixel in a particular frame if the corresponding pixel has not been filled, and
   determining, for each of the frames, a unified texture by taking a mean of inpainted texture and an average texture.

16. The computer-readable storage medium of claim 10, comprising the processor performing the operations comprising generating the depth map and the UV coordinate map with the renderer processing the input mesh.

17. The computer-readable storage medium of claim 10, wherein the input mesh is a scene-level proxy mesh, and the prompt is a text prompt.

18. The computer-readable storage medium of claim 10, wherein performing the UV-guided noise initialization comprises:
   generating a Gaussian noise texture for each object in the input mesh; and
   projecting the noise textures to each of the frames utilizing a frame-UV correspondence.

19. A computing apparatus comprising:
   a processor; and
   a memory storing instructions that, when executed by the processor, cause the processor to perform the operations of:
   processing a request to generate a four-dimensional (4D) video;
   generating keyframes from a depth map and a UV coordinate map, wherein the depth map and the UV coordinate map are generated from an input mesh;
   extracting, using a diffusion model, features from the keyframes; and
   generating frames of the 4D video based on a prompt, UV-guided noise initialization of each object, or a combination thereof; and
   injecting the features extracted from each of the keyframes into the diffusion model during a regeneration process.

20. The computing apparatus of claim 19, wherein the features comprise pre-attention features and post-attention features, the processor to perform blending of the pre-attention features and the post-attention features for injecting into the diffusion model:
   blending, for each of the frames, the pre-attention features and the post-attention features from the frames sequentially and filling a texel with features of its corresponding pixel in a particular frame if the corresponding pixel has not been filled before, and
   determining, for each of the frames, a unified texture by taking a mean of inpainted texture and an average texture.

* * * * *